US010557031B2

(12) United States Patent
Aoki et al.

(10) Patent No.: US 10,557,031 B2
(45) Date of Patent: Feb. 11, 2020

(54) COMPOSITION INCLUDING AMORPHOUS FLUOROPOLYMER AND FLUOROPLASTIC PARTICLES AND METHODS OF MAKING THE SAME

(71) Applicant: 3M INNOVATIVE PROPERTIES COMPANY, St. Paul, MN (US)

(72) Inventors: Tamon Aoki, Tokyo (JP); Allen M. Sohlo, Lindstrom, MN (US); Yuta Suzuki, Kanagawa (JP); Kai H. Lochhaas, Neuotting (DE); Florian D. Jochum, Neuotting (DE); Klaus Hintzer, Kastl (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 16 days.

(21) Appl. No.: 15/769,933

(22) PCT Filed: Oct. 19, 2016

(86) PCT No.: PCT/US2016/057647
§ 371 (c)(1),
(2) Date: Apr. 20, 2018

(87) PCT Pub. No.: WO2017/070172
PCT Pub. Date: Apr. 27, 2017

(65) Prior Publication Data
US 2018/0312678 A1 Nov. 1, 2018

Related U.S. Application Data

(60) Provisional application No. 62/245,334, filed on Oct. 23, 2015.

(51) Int. Cl.
*C08L 15/02* (2006.01)
*C08L 27/18* (2006.01)

(52) U.S. Cl.
CPC .............. *C08L 27/18* (2013.01); *C08L 15/02* (2013.01); *C08L 2205/025* (2013.01); *C08L 2207/53* (2013.01)

(58) Field of Classification Search
CPC .... C08L 27/18; C08L 15/02; C08L 2205/025; C08L 2207/53; C08L 2205/04; C08K 5/34924; C08K 5/0025; C08K 5/14; C08F 214/262
See application file for complete search history.

(56) References Cited

U.S. PATENT DOCUMENTS

| | | |
|---|---|---|
| 3,505,411 A | 4/1970 | Rice |
| 3,900,380 A | 8/1975 | Anderson |
| 4,035,565 A | 7/1977 | Apotheker |
| 4,243,770 A | 1/1981 | Tatemoto |
| 4,281,092 A | 7/1981 | Breazeale |
| 4,349,650 A | 9/1982 | Krespan |
| 4,972,038 A | 11/1990 | Logothetis |
| 5,010,130 A | 4/1991 | Chapman |
| 5,449,825 A | 9/1995 | Ishibe |
| 5,463,021 A | 10/1995 | Beyer |
| 5,554,680 A | 9/1996 | Ojakaar |
| 5,565,512 A | 10/1996 | Saito |
| 5,585,449 A | 12/1996 | Arcella |
| 5,612,419 A | 3/1997 | Arcella |
| 5,621,145 A | 4/1997 | Saito |
| 5,700,879 A | 12/1997 | Yamamoto |
| 5,717,036 A | 2/1998 | Saito |
| 5,767,204 A | 6/1998 | Iwa |
| 6,114,452 A | 9/2000 | Schmiegel |

(Continued)

FOREIGN PATENT DOCUMENTS

| | | |
|---|---|---|
| EP | 1548038 | 6/2005 |
| EP | 2194094 | 6/2010 |

(Continued)

OTHER PUBLICATIONS

Arcella, "New Peroxide Curable Perfluroroelastomer for High Temperature Applications," American Chemical Society, 1998, Paper No. 16, pp. 1-22.

Boyer, "Iodine Transfer Polymerization (ITP) of Vinylidene Fluoride (VDF). Influence of the Defect of VDF Chaining on the Control of ITP", Macromolecules, 2005, vol. 38, No. 25, 2005, pp. 10353-10362.

Comino, "New Peroxide Curable Perfluoroelastomer for High Temperature Applications", Progress in Rubber and Plastics Technology, 2001, vol. 17, No. 2, pp. 101-111.

Oka, "Vinylidene Fluoride—Hexafluoropropylene Copolymer having Terminal Iodines", Polymer Sciences, 1984, pp. 763-777.

Shroff, "Long-Chain-Branching Index for Essentially Linear Polyethylenes", Macromolecules, 1999, vol. 32, No. 25, pp. 8454-8464.

(Continued)

*Primary Examiner* — Nathan M Nutter

(57) ABSTRACT

A composition includes an amorphous fluoropolymer having at least one of: a segment represented by formula I: —CF($R_f$)—($CX_2$)$_n$—($CX_2CXR$)$_m$—O—R"$_fO_k$—(CXR'CX$_2$)$_p$—(CX$_2$)$_q$—CF(R'$_f$)— (I); or a terminal segment represented by formula III: $R_f$—CF(I)—(CX$_2$)$_n$—(CX$_2$CXR)$_m$—O—R"$_fO_k$—(CXR'CX$_2$)$_p$—(CX$_2$)$_q$—CF(R'$_f$)— (III), and fluoroplastic particles having a mean particle size of less than 500 nanometers. Each X is independently F, H, or Cl; $R_f$ and R'$_f$ are each independently F or a monovalent perfluoroalkyl having 1 to 3 carbon atoms; R is F or a partially fluorinated or perfluorinated alkyl having 1 to 3 carbon atoms; R"$_f$ is a divalent fluoroalkylene having 1 to 8 carbon atoms or a divalent fluorinated alkylene ether having 1 to 20 carbon atoms and at least one ether linkage; k is 0 or 1; and n, m, p, and q are each independently an integer from 0 to 5, with the proviso that when k is 0, n+m is at least 1 and p+q is at least 1. A method of making the composition is also provided.

20 Claims, No Drawings

(56) References Cited

U.S. PATENT DOCUMENTS

| | | | |
|---|---|---|---|
| 6,160,051 | A | 12/2000 | Tatsu |
| 6,191,314 | B1 | 2/2001 | Wlassics |
| 6,255,536 | B1 | 7/2001 | Worm |
| 6,281,312 | B1 | 8/2001 | Enokida |
| 6,294,627 | B1 | 9/2001 | Worm |
| 6,310,142 | B1 | 10/2001 | Apostolo |
| 6,380,337 | B2 | 4/2002 | Abe |
| 6,395,834 | B1 | 5/2002 | Albano |
| 6,429,258 | B1 | 8/2002 | Morgan |
| 6,573,410 | B2 | 6/2003 | Wassics |
| 6,646,077 | B1 | 11/2003 | Lyons |
| 6,734,254 | B1 | 5/2004 | Worm |
| 6,756,445 | B1 | 6/2004 | Irie |
| 6,960,381 | B2 | 11/2005 | Matsukura |
| 7,019,083 | B2 | 3/2006 | Grootaert |
| 7,022,773 | B2 | 4/2006 | Albano |
| 7,375,157 | B2 | 5/2008 | Amos |
| 7,408,006 | B2 | 8/2008 | Comino |
| 7,476,711 | B2 | 1/2009 | Takahashi |
| 8,168,714 | B2 | 5/2012 | Stanga |
| 8,604,137 | B2 | 12/2013 | Grootaert |
| 8,835,551 | B2 | 9/2014 | Fukushi |
| 8,877,870 | B2 | 11/2014 | Funaki |
| 8,912,283 | B2 | 12/2014 | Hayashi |
| 8,969,500 | B2 | 3/2015 | Hintzer |
| 9,018,309 | B2 | 4/2015 | Gurevich |
| 9,045,614 | B2 | 6/2015 | Ota |
| 9,234,063 | B2 | 1/2016 | Stanga |
| 9,688,786 | B2 | 6/2017 | Fantoni |
| 9,982,091 | B2 | 5/2018 | Hintzer |
| 2001/0008922 | A1 | 7/2001 | Abe |
| 2007/0015937 | A1 | 1/2007 | Hintzer |
| 2007/0072973 | A1 | 3/2007 | Funaki |
| 2007/0208137 | A1 | 9/2007 | Kasper |
| 2011/0245402 | A1* | 10/2011 | Stanga et al. ............ C08L 27/12 524/501 |
| 2012/0129982 | A1* | 5/2012 | Zipplies et al. ......... C08F 14/18 524/58 |
| 2013/0197163 | A1 | 8/2013 | Apostolo |

FOREIGN PATENT DOCUMENTS

| | | |
|---|---|---|
| EP | 2264100 | 12/2010 |
| JP | 1997-059468 | 3/1997 |
| JP | 2003176831 | 6/2003 |
| JP | 2005-350490 | 12/2005 |
| JP | 2006-207765 | 8/2006 |
| JP | 2008-031195 | 2/2008 |
| JP | 2008-303321 | 12/2008 |
| JP | 2010-0144127 | 7/2010 |
| WO | WO 2010-076876 | 7/2010 |
| WO | WO 2010-151610 | 12/2010 |
| WO | WO 2014-088804 | 6/2014 |
| WO | WO 2014-088820 | 6/2014 |

OTHER PUBLICATIONS

Shroff; "Assessment of NMR and Rheology for the Characterization of LCB in Essentially Linear Polyethylenes", Macromolecules, 2001, vol. 34, No. 21, pp. 7362-7367.

International Search Report for PCT International Application No. PCT/US2016/057647, dated Jan. 20, 2017, 4 pages.

* cited by examiner

COMPOSITION INCLUDING AMORPHOUS FLUOROPOLYMER AND FLUOROPLASTIC PARTICLES AND METHODS OF MAKING THE SAME

CROSS-REFERENCE TO RELATED APPLICATION

This application is a national stage filing under 35 U.S.C. 371 of PCT/US2016/057647, filed Oct. 19, 2016, which claims priority to U.S. Provisional Application No. 62/245,334, filed Oct. 23, 2015, the disclosure of which is incorporated by reference in its entirety herein.

BACKGROUND

Fluoroelastomers are known to have excellent mechanical properties, heat resistance, weather resistance, and chemical resistance, for example. Such beneficial properties render fluoroelastomers useful, for example, as O-rings, seals, hoses, skid materials, and coatings (e.g., metal gasket coating for automobiles) that may be exposed to elevated temperatures or corrosive environments. Fluoroelastomers have been found useful in the automotive, chemical processing, semiconductor, aerospace, and petroleum industries, among others.

Fluoroelastomers are typically prepared by combining an amorphous fluoropolymer, sometimes referred to as a fluoroelastomer gum, with one or more curatives, shaping the resulting curable composition into a desired shape, and curing the curable composition. The amorphous fluoropolymer often includes a cure site, which is a functional group incorporated into the amorphous fluoropolymer backbone capable of reacting with a certain curative.

Fluoroplastic particles of various sizes and either having a cure site or not having a cure site have been incorporated into fluoroelastomer matrices to improve one or more properties. See, for example, U.S. Pat. No. 7,476,711 (Takahashi et al.); U.S. Pat. No. 7,022,773 (Albano et al.); U.S. Pat. No. 7,019,083 (Grootaert et al.); U.S. Pat. No. 6,756,445 (Irie et al.); U.S. Pat. No. 6,734,254 (Worm et al.); U.S. Pat. No. 6,395,834 (Albano et al.); and U.S. Pat. Appl. Pub. No. 2011/0245402 (Stanga et al.).

SUMMARY

For certain applications, the requirements for mechanical properties and chemical resistance, for example, of elastomers are quite challenging. There is a continued need for improved chemical resistance without sacrificing mechanical properties.

In one aspect, the present disclosure provides a composition that includes an amorphous fluoropolymer having at least one of:

a segment represented by formula I:

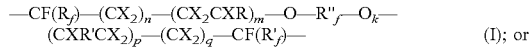

a terminal segment represented by formula III:

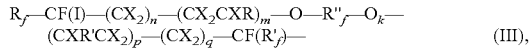

and fluoroplastic particles having a mean particle size of less than 500 nanometers. In Formulas I and III, X is independently selected from F, H, and Cl; $R_f$ and $R'_f$ are independently selected from F and a monovalent perfluoroalkyl having 1 to 3 carbon atoms; R is F, or a partially fluorinated or perfluorinated alkyl having 1 to 3 carbon atoms; $R''_f$ is a divalent fluoroalkylene having 1 to 8 carbon atoms or a divalent fluorinated alkylene ether having 1 to 20 carbon atoms and at least one ether linkage; k is 0 or 1; and n, m, p, and q are independently selected from an integer from 0 to 5, with the proviso that when k is 0, n+m is at least 1 and p+q is at least 1.

In another aspect, the present disclosure provides a method of making the composition. The method includes blending a first latex of the fluoroplastic particles and a second latex of the amorphous fluoropolymer.

In another aspect, the present disclosure provides a cured fluoroelastomer composition that includes a reaction product of a curing reaction of the composition and a peroxide.

In another aspect, the present disclosure provide a shaped article made from the cured fluoroelastomer.

In this Application:

Terms such as "a", "an" and "the" are not intended to refer to only a singular entity, but include the general class of which a specific example may be used for illustration. The terms "a", "an", and "the" are used interchangeably with the term "at least one". Also herein, recitation of "at least one" includes all numbers of one and greater (e.g., at least 2, at least 4, at least 6, at least 8, at least 10, at least 25, at least 50, at least 100, etc.).

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups having up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms.

The term "perfluoroalkyl group" includes linear, branched, and/or cyclic alkyl groups in which all C—H bonds are replaced by C—F bonds.

The terms "cure" and "curable" joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

"Cure site" refers to functional groups, which may participate in crosslinking.

A "monomer" is a molecule which can undergo polymerization which then forms part of the essential structure of a polymer.

"Polymer" refers to a macrostructure having a number average molecular weight (Mn) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

"Backbone" refers to the main continuous chain of the polymer.

All numerical ranges are inclusive of their endpoints and nonintegral values between the endpoints unless otherwise stated (e.g., 1 to 10 includes 1.4, 1.9, 2.33, 5.75, 9.98, etc.).

The above summary is not intended to describe each embodiment. The details of one or more embodiments of the invention are also set forth in the description below. Other features, objects, and advantages will be apparent from the description and from the claims.

DETAILED DESCRIPTION

Compositions according to the present disclosure include an amorphous fluoropolymer having at least one segment represented by formula I:

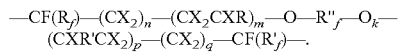

The segment represented by formula I is generally found in the backbone of the amorphous fluoropolymer. The segment represented by formula I can be introduced into the amorphous fluoropolymer, for example, by copolymerizing components including a fluorinated di-iodo ether compound represented by Formula II:

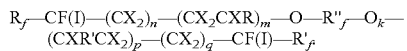

Typically, before curing, the amorphous fluoropolymer may have at least one terminal segment represented by formula III:

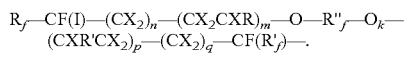

In formulas I, II, and III, each X is independently F, H, or Cl. In some embodiments, each X is independently F or H. In some embodiments, the segment represented by formula I is perfluorinated, and each X is F.

In formulas I, II, and III, $R_f$ and $R'_f$ are each independently F or a monovalent perfluoroalkyl having 1, 2, or 3 carbon atoms, which may be linear or branched. In some embodiments, at least one of $R_f$ or $R'_f$ is F. In some embodiments, at least one of $R_f$ or $R'_f$ is independently a perfluorinated alkyl (e.g., $-CF_3$ or $-CF_2CF_3$). In some embodiments, at least one of $R_f$ or $R'_f$ is F and the other $R_f$ or $R'_f$ is $-CF_3$. In some embodiments, each $R_f$ and $R'_f$ is F.

In formulas I, II, and III, R and R' are each independently F or a partially fluorinated or perfluorinated alkyl having 1, 2, or 3 carbon atoms, which may be linear or branched. In some embodiments, at least one of R or R' is F. In some embodiments, at least one of R or R' is independently a partially fluorinated or perfluorinated alkyl (e.g., $-CF_3$, $-CF_2CF_3$, or $-CF_2-CF_2H$). In some embodiments, R and R' are each independently F or a perfluorinated alkyl having 1, 2, or 3 carbon atoms, which may be linear or branched. In some embodiments, at least one of R or R' is F and the other R or R' is $-CF_3$. In some embodiments, each R and R' is F.

In formulas I, II, and III, $R''_f$ is a divalent fluoroalkylene having from 1 to 8 carbon atoms or a divalent fluorinated alkylene ether having from 1 to 20 carbons and at least one ether linkage. In some embodiments, $R''_f$ is a divalent linear or branched fluoroalkylene having from 1 to 8 (in some embodiments, 1 to 6, 1 to 5, 1 to 4, 1 to 3, or 1 to 2) carbon atoms. In other embodiments, $R''_f$ is a divalent linear or branched fluorinated alkylene ether having from 1 to 20 (in some embodiments, 1 to 15, 1 to 10, 1 to 8, or 1 to 6) carbon atoms and at least one (in some embodiments, 2, 3, 4, or 5) ether linkage. It should be understood that an ether linkage requires a carbon atom on either side of an oxygen atom and that $R''_f$ cannot terminate with an O— group, resulting in a peroxy group (i.e., —O—O—) in Formula I, II, or III. Examples of useful $R''_f$ segments include $-CF_2-$; $-CF_2-CF_2-$; $-CF_2-CF_2-CF_2-$; $-(CF_2)_x-$, wherein x is an integer from 1 to 5; $-CFH-$; $-CFH-CF_2-$; $-CH_2-CF_2-$; $-CF_2-CF(CF_3)-$; $-CH_2-CF_2-CF_2-$; $-CF_2-CHF-CF_2-$; $-CF_2-CH_2-CF_2-$; $-CF_2-(OCF_2)_y-$ wherein y is an integer from 0 to 6; $-CF_2-(O-[CF_2]_x)_z-$ wherein x is an integer from 1 to 5, and z is an integer from 1 to 4; $-CF_2-(O_4CF_2)-CF_2-$ where x is an integer from 0 to 5; $-CX_1X_2-(O-[CF-X_3])_b-CX_4X_5-$ wherein h is an integer from 0 to 5, and wherein $X_1$, $X_2$, $X_3$, $X_4$, and $X_5$ are each independently H, F, or Cl; $-(CF_2)-(OCF_2-CF(CF_3))_3-O-(CF_2)$ wherein each x is independently an integer from 1 to 5 and j is an integer from 0 to 5; and $-(CF_2-CF(CF_3)-O)_k-O-(CF_2)_x(-O-(CF_2-CF(CF_3)O)_l-(CF_2)-$ where k is an integer from 1 to 3, each x is independently an integer from 1 to 5, and l is an integer from 0 to 3.

In formulas I, II, and III, k is 0 or 1; and n, m, q, and p are each independently an integer from 0 to 5. In some embodiments, k is 0. When k is 0, n+m is at least 1 and p+q is at least 1. In some embodiments, k is 1. In some embodiments, n and q are each independently from 1 to 10, 2 to 10, or 3 to 10. In some embodiments, n and q are each 1.

In some embodiments, the segment represented by formula I, terminal segment represented by formula III, and/or the fluorinated di-iodo ether compound represented by formula II is either perfluorinated (comprising C—F bonds and no C—H bonds) or highly fluorinated, comprising less than 1%, 0.5% or even 0.25% by weight of hydrogen.

Examples of useful fluorinated di-iodo ether compounds that can be useful to introduce the segment represented by formula I or terminal segment represented by formula III into an amorphous fluoropolymer include:
$I-CF_2-CF_2-O-CF_2-CF_2-I$; $I-CF_2-CF_2-O-(CF_2)_b-I$ wherein b is an integer from 3-10;
$I-(CF_2)_c-O-(CF_2)_b-I$ wherein c is an integer from 3-10 and b is an integer from 3-10;
$ICF_2-CF_2-O-CF_2-O-CF_2-CF_2-I$;
$ICF_2-CF_2-O-CF_2-(CF_2)_b-O-CF_2-CF_2I$ wherein b is an integer from 1-5;
$ICF_2-CF_2[O-CF_2-(CF_2)_b]_z-O-CF_2-CF_2I$ wherein b is an integer from 1-5, z is an integer from 1-4;
$ICF_2-CF_2-O-CF_2-CF_2-CF_2-O-CF_2-CF_2I$;
$I-CF_2-CH_2-O-CF_2-CF_2-CF_2I$; $I-CF_2-CH_2-CF_2-O-CF_2-CF_2-CF_2I$;
$I-CF_2-CHF-CF_2-O-CF_2-CF_2-CF_2I$; $ICF_2-CF_2-O-CF_2-CFI-CF_3$
$ICF_2-CF_2-(CF_2)_a-[O-CF(CF_3)-CF_2]_b-(O-[CF_2]_c)_z-O[-CF_2]_d-CF_2-CF_2I$ wherein a is an integer from 0-6, b is an integer from 0-5, c, is an integer from 1-6, d is an integer from 0-6 and z is an integer from 0-6;
$ICF_2-(CF_2)_a-(O-CF_2CF(CF_3))_b-O-(CF_2)_c-O-(CF_2-CF(CF_3)-O)_d-(CF_2)_z-O-CF_2CF_2-I$ wherein a is an integer from 0-6, b is an integer from 0-5, c, is an integer from 1-6, d is an integer from 0-5 and z is an integer from 0-5; and $I-CF_2-(CF_2)_a-O-(CF_2)_b-O-CF_2-CF(CF_3)-I$ wherein a is an integer from 1-5 and b is an integer from 1-5.

Some of these compounds are available commercially, for example, from Anles (St. Petersburg-Russia). Others can be prepared by known synthesis, for example, by addition of IF to bis-olefins. In another example, iodine-containing acid fluorides can be reacted with alkylfluoro-sulfate followed by IF-addition. In another example, fluorinated sulfinates can be reacted with iodine salts.

One or more segments represented by formula I or III may be present in the amorphous fluoropolymer, and each segment represented by formula I or III may be independently selected. When each segment of formula I or III is independently selected, it should be understood that each X, $R_f$, $R'_f$, R, R', $R''_f$, k, m, n, p, and q are independently selected. To introduce more than one segment represented by formula I or III into the amorphous fluoropolymer mixtures of two or more independently selected di-iodo ether compounds represented by formula II can be used as chain transfer agents in the preparation of the amorphous fluoropolymer.

While iodine groups have been introduced into amorphous fluoropolymers using, for example, organic chain transfer agents (such as $CF_2I_2$ or $ICF_2CF_2CF_2I$), and/or fluorinated cure site monomers, there are disadvantages to using the compounds. These fluorinated compounds are sometimes expensive. Furthermore, because they are typically not very water soluble, when doing an aqueous polymerization, certain steps are generally taken to improve their incorporation. For example, co-solvents, fluorinated emulsifiers, and/or preemulsions of the fluorinated chain transfer agents and/or fluorinated cure site monomers may be used during the polymerization to assist with the solubility issues of the fluorinated chain transfer agents and/or fluorinated cure site monomers. In another example, the fluorinated chain transfer agents and/or fluorinated cure site monomers may be sprayed as small droplets into the reaction vessel to more quickly solubilize the fluorinated chain transfer agents and/or fluorinated cure site monomers in the water. This poses a disadvantage in manufacturing because solvents have to be removed and recycled which increases the cost of the polymerization. Emulsifiers are also desirably removed from the resulting fluoropolymer, which leads to increased process steps and costs as well.

As reported in Int. Pat. Appl. Pub. No. WO 2015/134435 (Hintzer et al.), using a fluorinated di-iodo ether compound as described above in any of its embodiments during polymerization of fluorinated monomers typically avoids the above-mentioned issues. For example, the fluorinated di-iodo ether compounds have higher solubilities in water compared to materials having the same number of carbons but no oxygen, eliminating or reducing the need for organic solvents and/or fluorinated emulsifiers while enabling a sufficient amount of iodine to be incorporated into the fluoropolymer. Additionally, although not wanting to be limited by theory, because these fluorinated di-iodo ether compounds can be polymerized by both ends and comprise an ether linkage, these compounds may enable flexibility in the polymer backbone, which could impact $T_g$ (glass transition temperature) and/or prevent crystallization during elongation of the polymer.

The amorphous fluoropolymer useful in the composition according to the present disclosure are typically polymers or copolymers of at least one fluorinated olefin prepared in the presence of the fluorinated di-iodo ether compound. Copolymers can be copolymers of one or more fluorinated olefins, other fluorinated monomers, non-fluorinated monomers, cure site monomers, or combinations of these monomers.

Examples of suitable fluorinated olefins include perfluoroolefins (e.g., tetrafluoroethylene (TFE) and hexafluoropropylene (HFP), or any perfluoroolefin of the formula $CF_2$=CF—Rf, where $R_f$ is fluorine or a perfluoroalkyl of 1 to 8, in some embodiments 1 to 3, carbon atoms), halogenated fluoroolefins (e.g., trifluorochloroethylene (CTFE)), and partially fluorinated olefins (e.g., vinylidene fluoride (VDF), pentafluoropropylene, trifluoroethylene, $CH_2$=CF—$CF_3$, or an olefin in which less than half or less than one-fourth of the hydrogen atoms are replaced with fluorine). Other useful fluorinated monomers include perfluorovinyl ethers (e.g., perfluoroalkyl vinyl ethers (PAVE) and perfluoroalkoxyalkyl vinyl ethers (PAAVE)), and hydrogen-containing monomers such as olefins (e.g., ethylene, propylene, or another non-fluorinated alpha-olefin such as a $C_2$ to $C_9$ alpha olefin). Examples of such amorphous fluoropolymers include, for example, those referred to in the art as "fluoroelastomer gums" and "perfluoroelastomer gums". In some embodiments, the fluoropolymer comprises interpolymerized units of tetrafluoroethylene and at least one of a different perfluorinated olefin, a partially fluorinated olefin, a non-fluorinated olefin, a perfluoroalkylvinylether, or a perfluoroalkoxyalkyl vinylether. In some embodiments, the amorphous fluoropolymer is a copolymer of a fluorinated olefin and at least one of a fluorinated vinyl ether or fluorinated allyl ether. Those skilled in the art are capable of selecting specific interpolymerized units at appropriate amounts to form a fluoroelastomer.

In some embodiments, halogen- or hydrogen-containing olefins useful as monomers in the amorphous fluoropolymer include those of the formula $CX_2$=CX—R, wherein each X is independently hydrogen, fluoro, or chloro and R is hydrogen, fluoro, or a $C_1$-$C_{12}$, in some embodiments $C_1$-$C_3$, alkyl, with the proviso that not all X and R groups are fluoro groups. In some embodiments, polymerized units derived from non-fluorinated olefin monomers (e.g., at least one of propylene, ethylene, or isobutylene) are present in the amorphous fluoropolymer at up to 40 mole percent, 30 mole percent, or 25 mole percent of the fluoropolymer, in some embodiments up to 10 mole percent, 5 mole percent, or up to 3 mole percent.

Perfluoroalkyl vinyl ethers suitable for making an amorphous fluoropolymer include those represented by formula $CF_2$=$CFORf_1$, wherein $Rf_1$ is a perfluoroalkyl group having from 1 to 6, 1 to 5, 1 to 4, or 1 to 3 carbon atoms. Examples of useful perfluoroalkyl vinyl ethers include perfluoromethyl vinyl ether ($CF_2$=$CFOCF_3$), perfluoroethyl vinyl ether ($CF_2$=$CFOCF_2CF_3$), and perfluoropropyl vinyl ether ($CF_2$=$CFOCF_2CF_2CF_3$).

Perfluoroalkoxyalkyl vinyl ethers suitable for making an amorphous fluoropolymer include those represented by formula $CF_2$=$CF(OC_nF_{2n})_zORf_2$, in which each n is independently from 1 to 6, z is 1 or 2, and $Rf_2$ is a linear or branched perfluoroalkyl group having from 1 to 8 carbon atoms and optionally interrupted by one or more —O— groups. In some embodiments, n is from 1 to 4, or from 1 to 3, or from 2 to 3, or from 2 to 4. In some embodiments, n is 1 or 3. In some embodiments, n is 3. $C_nF_{2n}$ may be linear or branched. In some embodiments, $C_nF_{2n}$ can be written as $(CF_2)_n$, which refers to a linear perfluoroalkylene group. In some embodiments, $C_nF_{2n}$ is —$CF_2$—$CF_2$—$CF_2$—. In some embodiments, $C_nF_{2n}$ is branched, for example, —$CF_2$—CF($CF_3$)—. In some embodiments, $(OC_nF_{2n})_z$ is represented by —O—$(CF_2)_{1-4}$—$[O(CF_2)_{1-4}]_{0-1}$. In some embodiments, $Rf_2$ is a linear or branched perfluoroalkyl group having from 1 to 8 (or 1 to 6) carbon atoms that is optionally interrupted by up to 4, 3, or 2 —O— groups. In some embodiments, $Rf_2$ is a perfluoroalkyl group having from 1 to 4 carbon atoms optionally interrupted by one —O— group. Examples of suitable perfluoroalkoxyalkyl vinyl ethers include $CF_2$=$CFOCF_2OCF_3$, $CF_2$=$CFOCF_2OCF_2CF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2CF_2OCF_2CF_3$, $CF_2$=$CFOCF_2CF_2CF_2OCF_2CF_3$, $CF_2$=$CFOCF_2CF_2\ CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2\ CF_2OCF_3$, $CF_2$=$CFOCF_2CF_2OCF_2CF_2CF_2CF_2OCF_3$, $CF_2$=$CFOCF_2CF_2OCF_2CF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFOCF_2CF_2OCF_2OCF_2OCF_3$, $CF_2$=$CFOCF_2CF_2OCF_2CF_3\ CF_2$=$CFOCF_2CF_2OCF_2CF_2OCF_2CF_3$, $CF_2$=$CFOCF_2CF(CF_3)$—O—$C_3F_7$ (PPVE-2), $CF_2$=$CF(OCF_2CF(CF_3))_2$—O—$C_3F_7$ (PPVE-3), and $CF_2$=$CF(OCF_2CF(CF_3))_3$—O—$C_3F_7$ (PPVE-4). Many of these perfluoroalkoxyalkyl vinyl ethers can be prepared according to the methods described in U.S. Pat. No. 6,255,536 (Worm et al.) and U.S. Pat. No. 6,294,627 (Worm et al.).

Perfluoroalkyl allyl ethers and perfluoroalkoxyalkyl allyl ethers may also be useful for making an amorphous polymer in the composition according to the present disclosure. Suitable perfluoroalkoxyalkyl allyl ethers include those represented by formula $CF_2\!=\!CFCF_2(OC_nF_{2n})_zORf_2$, in which n, z, and $Rf_2$ are as defined above in any of the embodiments of perfluoroalkoxyalkyl vinyl ethers. Examples of suitable perfluoroalkoxyalkyl allyl ethers include $CF_2\!=\!CFCF_2OCF_2CF_2OCF_3$, $CF_2\!=\!CFCF_2OCF_2CF_2CF_2OCF_3$, $CF_2\!=\!CFCF_2OCF_2OCF_3$, $CF_2\!=\!CFCF_2OCF_2OCF_2CF_3$, $CF_2\!=\!CFCF_2OCF_2CF_2CF_2CF_2OCF_3$, $CF_2\!=\!CFCF_2OCF_2CF_2\text{ O-}CF_2CF_3$, $CF_2\!=\!CFCF_2OCF_2CF_2CF_2OCF_2CF_3$, $CF_2\!=\!CFCF_2OCF_2CF_2CF_2CF_2OCF_2CF_3$, $CF_2\!=\!CFCF_2OCF_2CF_2O-CF_2OCF_3$, $CF_2\!=\!CFCF_2OCF_2CF_2OCF_2OCF_3$, $CF_2\!=\!CFCF_2OCF_2CF_2OCF_2CF_2OCF_3$, $CF_2\!=\!CFCF_2OCF_2CF_2OCF_2CF_2CF_2OCF_3CF_2\!=\!CFCF_2OCF_2CF_2OCF_2CF_2CF_2CF_2OCF_3$, $CF_2\!=\!CFCF_2OCF_2CF_2(OCF_2)_3O-CF_3CF_2\!=\!CFCF_2OCF_2CF_2(OCF_2)_4OCF_3$, $CF_2\!=\!CFCF_2OCF_2CF_2OCF_2OCF_3$, $CF_2\!=\!CFCF_2OCF_2CF_2\text{ }OCF_2CF_2CF_3$, $CF_2\!=\!CFCF_2OCF_2CF_2OCF_2CF_2OCF_2CF_3$, $CF_2\!=\!CFCF_2OCF_2CF(CF_3)\!-\!O\!-\!C_3F_7$, and $CF_2\!=\!CFCF_2(OCF_2CF(CF_3))_2\!-\!O\!-\!C_3F_7$. Many of these perfluoroalkoxyalkyl allyl ethers can be prepared, for example, according to the methods described in U.S. Pat. No. 4,349,650 (Krespan).

Perfluorinated vinyl and allyl ethers are typically liquids and may be pre-emulsified with an emulsifier before its copolymerization with the other comonomers, for example, addition of a gaseous fluoroolefin. In some embodiments, polymerized units derived from at least one of PAVE or PAAVE monomers are present in the amorphous fluoropolymer at up to 50 mole percent of the fluoropolymer, in some embodiments up to 40 mole percent, or up to 30 mole percent, or up to 10 mole percent.

If the amorphous fluoropolymer is perhalogenated, in some embodiments perfluorinated, typically at least 50 mole percent (mol %) of its interpolymerized units are derived from TFE and/or CTFE, optionally including HFP. The balance of the interpolymerized units of the amorphous fluoropolymer (e.g., 10 to 50 mol %) is made up of one or more perfluoroalkyl vinyl ethers and/or perfluoroalkoxyalkyl vinyl ethers and/or perfluoroallyl ethers and/or perfluoroalkoxyallyl ethers, and, in some embodiments, a cure site monomer. If the fluoropolymer is not perfluorinated, it typically contains from about 5 mol % to about 90 mol % of its interpolymerized units derived from TFE, CTFE, and/or HFP; from about 5 mol % to about 90 mol % of its interpolymerized units derived from VDF, ethylene, and/or propylene; up to about 40 mol % of its interpolymerized units derived from a vinyl ether; and from about 0.1 mol % to about 5 mol %, in some embodiments from about 0.3 mol % to about 2 mol %, of a cure site monomer.

Examples of amorphous fluoropolymers useful for practicing the present disclosure include a TFE/propylene copolymer, a TFE/propylene/VDF copolymer, a VDF/HFP copolymer, a TFE/VDF/HFP copolymer, a TFE/perfluoromethyl vinyl ether (PMVE) copolymer, a $TFE/CF_2\!=\!CFOC_3F_7$ copolymer, a $TFE/CF_2\!=\!CFOCF_3/CF_2\!=\!CFOC_3F_7$ copolymer, a $TFE/CF_2\!=\!COC_2F_5$ copolymer, a TFE/ethyl vinyl ether (EVE) copolymer, a $TFE/CF_2\!=\!CFOCF_2OCF_3$ copolymer, a $TFE/CF_2\!=\!CFOCF_2OCF_2CF_3$ copolymer, a TFE/butyl vinyl ether (BVE) copolymer, a TFE/EVE/BVE copolymer, a $VDF/CF_2\!=\!CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, and a $TFE/VDF/CF_2\!=\!CFO(CF_2)_3OCF_3$ copolymer.

In some embodiments, components to be polymerized to make an amorphous fluoropolymer further include a fluorinated bisolefin compound represented by the following formula:

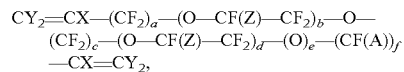

wherein a is an integer selected from 0, 1, and 2; b is an integer selected from 0, 1, and 2; c is an integer selected from 0, 1, 2, 3, 4, 5, 6, 7, and 8; d is an integer selected from 0, 1, and 2; e is 0 or 1; f is an integer selected from 0, 1, 2, 3, 4, 5, and 6; Z is independently selected from F and $CF_3$; A is F or a perfluorinated alkyl group; X is independently H or F; and Y is independently selected from H, F, and $CF_3$. In a preferred embodiment, the highly fluorinated bisolefin compound is perfluorinated, meaning that X and Y are independently selected from F and $CF_3$.

Examples of useful fluorinated bisolefin compounds include: $CF_2\!=\!CF\!-\!O\!-\!(CF_2)_2\!-\!O\!-\!CF\!=\!CF_2$, $CF_2\!=\!CF\!-\!O\!-\!(CF_2)_3\!-\!O\!-\!CF\!=\!CF_2$, $CF_2\!=\!CF\!-\!O\!-\!(CF_2)_4\!-\!O\!-\!CF\!=\!CF_2$, $CF_2\!=\!CF\!-\!O\!-\!(CF_2)_5\!-\!O\!-\!CF\!=\!CF_2$, $CF_2\!=\!CF\!-\!O\!-\!(CF_2)_6\!-\!O\!-\!CF\!=\!CF_2$, $CF_2\!=\!CF\!-\!CF_2\!-\!O\!-\!(CF_2)_2\!-\!O\!-\!CF\!=\!CF_2$, $CF_2\!=\!CF\!-\!CF_2\!-\!O\!-\!(CF_2)_3\!-\!O\!-\!CF\!=\!CF_2$, $CF_2\!=\!CF\!-\!CF_2\!-\!O\!-\!(CF_2)_4\!-\!O\!-\!CF\!=\!CF_2$, $CF_2\!=\!CF\!-\!CF_2\!-\!O\!-\!(CF_2)_4\!-\!O\!-\!CF\!=\!CF_2$, $CF_2\!=\!CF\!-\!CF_2\!-\!O\!-\!(CF_2)_5\!-\!O\!-\!CF\!=\!CF_2$, $CF_2\!=\!CF\!-\!CF_2\!-\!O\!-\!(CF_2)_6\!-\!O\!-\!CF\!=\!CF_2$, $CF_2\!=\!CF\!-\!CF_2\!-\!O\!-\!(CF_2)_2\!-\!O\!-\!CF_2\!-\!CF\!=\!CF_2$, $CF_2\!=\!CF\!-\!CF_2\!-\!O\!-\!(CF_2)_3\!-\!O\!-\!CF_2\!-\!CF\!=\!CF_2$, $CF_2\!=\!CF\!-\!CF_2\!-\!O\!-\!(CF_2)_4\!-\!O\!-\!CF_2\!-\!CF\!=\!CF_2$, $CF_2\!=\!CF\!-\!CF_2\!-\!O\!-\!(CF_2)_5\!-\!O\!-\!CF_2\!-\!CF\!=\!CF_2$, $CF_2\!=\!CF\!-\!CF_2\!-\!O\!-\!(CF_2)_6\!-\!O\!-\!CF_2\!-\!CF\!=\!CF_2$, $CF_2\!=\!CF\!-\!O\!-\!CF_2CF_2\!-\!CH\!=\!CH_2$, $CF_2\!=\!CF\!-\!(OCF(CF_3)CF_2)\!-\!O\!-\!CF_2CF_2\!-\!CH\!=\!CH_2$, $CF_2\!=\!CF\!-\!(OCF(CF_3)CF_2)_2\!-\!O\!-\!CF_2CF_2\!-\!CH\!=\!CH_2$, $CF_2\!=\!CF\text{ }CF_2\!-\!O\!-\!CF_2CF_2\!-\!CH\!=\!CH_2$, $CF_2\!=\!CF\text{ }CF_2\!-\!(OCF(CF_3)CF_2)\!-\!O\!-\!CF_2CF_2\!-\!CH\!=\!CH_2$, $CF_2\!=\!CFCF_2\!-\!(OCF(CF_3)CF_2)_2\!-\!O\!-\!CF_2CF_2\!-\!CH\!=\!CH_2$, $CF_2\!=\!CF\!-\!CF_2\!-\!CH\!=\!CH_2$, $CF_2\!=\!CF\!-\!O\!-\!(CF_2)_c\!-\!O\!-\!CF_2\!-\!CH\!=\!CH_2$ wherein c is an integer selected from 2 to 6, $CF_2\!=\!CFCF_2\!-\!O\!-\!(CF_2)_c\!-\!O\!-\!CF_2\!-\!CF_2\!-\!CH\!=\!CH_2$ wherein c is an integer selected from 2 to 6, $CF_2\!=\!CF\!-\!(OCF(CF_3)CF_2)_b\!-\!O\!-\!CF(CF_3)\!-\!CH\!=\!CH_2$ wherein b is 0, 1, or 2, $CF_2\!=\!CF\!-\!CF_2\!-\!(OCF(CF_3)CF_2)_b\!-\!O\!-\!CF(CF_3)\!-\!CH\!=\!CH_2$ wherein b is 0, 1, or 2, $CH_2\!=\!CH\!-\!(CF_2)_n\!-\!O\!-\!CH\!=\!CH_2$ wherein n is an integer from 1-10, and $CF_2\!=\!CF\!-\!(CF_2)_a\!-\!(O\!-\!CF(CF_3)CF_2)_b\!-\!O\!-\!(CF_2)_c\!-\!(OCF(CF_3)CF_2)_f\!-\!O\!-\!CF\!=\!CF_2$ wherein a is 0 or 1, b is 0, 1, or 2, c is 1, 2, 3, 4, 5, or 6, and f is 0, 1, or 2.

In some embodiments, the fluorinated bisolefin compound is $CF_2\!=\!CF\!-\!O\!-\!(CF_2)_n\!-\!O\!-\!CF\!=\!CF_2$ where n is an integer from 2-6; $CF_2\!=\!CF\!-\!(CF_2)_a\!-\!O\!-\!(CF_2)_n\!-\!O\!-\!(CF_2)_b\!-\!CF\!=\!CF_2$ where n is an integer from 2-6 and a and b are 0 or 1; or a perfluorinated compound comprising a perfluorinated vinyl ether and a perfluorinated allyl ether.

Useful amounts of the fluorinated bisolefin include 0.01 mol % to 1 mol % of the fluorinated bisolefin compound based on total moles of monomer incorporated. In some embodiments, at least 0.02, 0.05, or even 0.1 mol % of the fluorinated bisolefin compound is used and at most 0.5, 0.75, or even 0.9 mol % of a compound of the fluorinated bisolefin compound is used based on the total moles of monomer incorporated into the amorphous polymer.

In some embodiments, the amorphous fluoropolymer useful in the composition according to the present disclosure includes polymerized units comprising a cure site. In these embodiments, cure site monomers may be useful during the polymerization to make the amorphous fluoropolymer. Such cure site monomers include those monomers capable of free radical polymerization. Additionally, the cure site monomer can be perfluorinated to ensure adequate thermal stability of the resulting elastomer. Examples of useful cure sites include a Br cure site, an I cure site, a nitrile cure site, a carbon-carbon double bond, and combinations thereof. Any of these cure sites can be cured using peroxides as described below. However, in some cases in which multiple, different cure sites are present a dual cure system or a multi cure system may be useful. Other suitable cure systems that may be used in combination with a peroxide include bisphenol curing systems or triazine curing systems.

In some embodiments, the cure site monomer comprises an iodine capable of participating in a peroxide cure reaction, where, for example, the iodine atom capable of participating in the peroxide cure reaction is located at a terminal position of the backbone chain. In some embodiments, a fluorinated iodine containing cure site monomer may be used as represented by the following formula:
$CY_2$—CX—$(CF_2)_g$—(O—$CF(CF_3)$—$CF_2)_h$—O—$(CF_2)_i$—$(O)_j$—$(CF_2)_k$—CF(I)—X (IV) wherein X and Y are independently selected from H, F, and $CF_3$; g is 0 or 1; h is an integer selected from 0, 2, and 3; i is an integer selected from 0, 1, 2, 3, 4, and 5; j is 0 or 1; and k is an integer selected from 0, 1, 2, 3, 4, 5, and 6. In one in embodiment, the fluorinated iodine containing cure site monomer is perfluorinated. Examples of suitable compounds of Formula (IV) include: $CF_2$=$CF_0C_4F_8I$ (MV4I), $CF_2$=$CFOC_2F_4I$, $CF_2$=$CFOCF_2CF(CF_3)OC_2F_4I$, $CF_2$=CF—$(OCF_2CF(CF_3))_2$—O—$C_2F_4I$, $CF_2$=CF—O—$CF_2CFI$—$CF_3$, $CF_2$=CF—O—$CF_2CF(CF_3)$—O—$CF_2CFI$—$CF_3$, $CF_2$=CF—O—$(CF_2)_2$—O—$C_2F_4I$, $CF_2$=CF—O—$(CF_2)_3$—O—$C_2F_4I$, $CF_2$=CF—O—$(CF_2)_4$—O—$C_2F_4I$, $CF_2$=CF—O—$(CF_2)_5$—O—$C_2F_4I$, $CF_2$=CF—O—$(CF_2)_6$—O—$C_2F_4I$, $CF_2$=CF—$CF_2$—O—$CF_2$—O—$C_2F_4I$, $CF_2$=CF—$CF_2$—O—$(CF_2)_2$—O—$C_2F_4I$, $CF_2$=CF—$CF_2$—O—$(CF_2)_3$—O—$C_2F_4I$, $CF_2$=CF—$CF_2$—O—$(CF_2)_4$—O—$C_2F_4I$, $CF_2$=CF—$CF_2$—O—$(CF_2)_5$—O—$C_2F_4I$, $CF_2$=CF—$CF_2$—O—$(CF_2)_6$—O—$C_2F_4I$, $CF_2$=CF—$CF_2$—O—$C_4F_8I$, $CF_2$=CF—$CF_2$—O—$C_2F_4I$, $CF_2$=CF—$CF_2$—O—$CF_2CF(CF_3)$—O—$C_2F_4I$, $CF_2$=CF—$CF_2$—$(OCF_2CF(CF_3))_2$—O—$C_2F_4I$, $CF_2$=CF—$CF_2$—O—$CF_2CFI$—$CF_3$, $CF_2$=CF—$CF_2$—O—$CF_2CF(CF_3)$—O—$CF_2CFI$—$CF_3$, and combinations thereof. In some embodiments, the cure site monomer comprises at least one of $CF_2$=$CF_0C_4F_8I$; $CF_2$=$CFCF_2OC_4F_8I$; $CF_2$=$CFOC_2F_4I$; $CF_2$=$CFCF_2OC_2F_4I$; $CF_2$=CF—O—$(CF_2)_n$—O—$CF_2$—$CF_2I$, or $CF_2$=CF-$CF_2$—O—$(CF_2)_n$—O—$CF_2$—$CF_2I$ wherein n is an integer selected from 2, 3, 4, or 6.

Useful amounts of the compound of Formula (IV) include 0.01 mol % to 1 mol %, based on total moles of monomer incorporated may be used. In some embodiments, at least 0.02, 0.05, or even 0.1 mol % of a compound Formula (IV) is used and at most 0.5, 0.75, or even 0.9 mol % of a compound of Formula (IV) is used based on the total moles of monomer incorporated into the amorphous fluoropolymer.

Examples of other useful cure site monomers include bromo- or iodo-(per)fluoroalkyl-(per)fluorovinylethers having the formula ZRf—O—CX=$CX_2$, wherein each X may be the same or different and represents H or F, Z is Br or I, $R_f$ is a $C_1$-$C_{12}$ (per)fluoroalkylene, optionally containing chlorine and/or ether oxygen atoms. Suitable examples include $ZCF_2$—O—CF=$CF_2$, $ZCF_2CF_2$—O—CF=$CF_2$, $ZCF_2CF_2CF_2$—O—CF=$CF_2$, $CF_3CFZCF_2$—O—CF=$CF_2$, wherein Z represents Br of I. Still other examples of useful cure site monomers include bromo- or iodo (per)fluoroolefins such as those having the formula Z'—$(R_f)_r$—CX=$CX_2$, wherein each X independently represents H or F, Z' is Br or I, $R_f$ is a $C_1$-$C_{12}$ perfluoroalkylene, optionally containing chlorine atoms and r is 0 or 1. Suitable examples include bromo- or iodo-trifluoroethene, 4-bromo-perfluorobutene-1,4-iodo-perfluorobutene-1, or bromo- or iodo-fluoroolefins such as 1-iodo,2,2-difluroroethene, 1-bromo-2,2-difluoroethene, 4-iodo-3,3,4,4,-tetrafluorobutene-1 and 4-bromo-3,3,4,4-tetrafluorobutene-1. Non-fluorinated bromo and iodo-olefins such as vinyl bromide, vinyl iodide, 4-bromo-1-butene and 4-iodo-1-butene may also be useful as cure site monomers. Typically these cure-site monomers, if used, are used in amounts of at least 0.01, 0.02, 0.05, or 0.1 mol % and at most 0.5, 0.75, 0.9, or 1 mol % based on the total moles of monomer incorporated into the amorphous fluoropolymer.

In some embodiments of the amorphous fluoropolymer useful in the composition according to the present disclosure includes a nitrile cure site. Nitrile cure sites can be introduced into the polymer by using nitrile containing monomers during the polymerization. Examples of suitable nitrile containing monomers include those represented by formulas $CF_2$=CF—$CF_2$—O—Rf—CN; $CF_2$=$CFO(CF_2)_r$CN; $CF_2$=$CFO[CF_2CF(CF_3)O]_p(CF_2)_vOCF(CF_3)$CN; and $CF_2$=$CF[OCF_2CF(CF_3)]_kO(CF_2)_u$CN, wherein, r represents an integer of 2 to 12; p represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing fluorinated monomers include perfluoro (8-cyano-5-methyl-3,6-dioxa-1-octene), $CF_2$=$CFO(CF_2)_5$CN, and $CF_2$=$CFO(CF_2)_3OCF(CF_3)$CN. Typically these cure-site monomers, if used, are used in amounts of at least 0.01, 0.02, 0.05, or 0.1 mol % and at most 0.5, 0.75, 0.9, or 1 mol % based on the total moles of monomer incorporated into the amorphous fluoropolymer.

Amorphous fluoropolymers useful in the composition according to the present disclosure typically do not have a melting point. Generally, they have a glass transition temperature (Tg) of up to 25° C., and, in some embodiment, below 0° C.

The fluoroplastic particles useful in the composition according to the present disclosure are semicrystalline materials. The fluoroplastic can include polytetrafluoroethylene particles, which may or may not be fibrillating particles. The fluoroplastic can be formed of slightly modified tetrafluoroethylene polymer (e.g., below about 5 mol % comonomer) or of tetrafluoroethylene copolymers with one or more monomers (e.g., at least about 5 mol % comonomer) containing at least one ethylene unsaturation. Any of the perfluorinated olefins, partially fluorinated olefins, halogenated fluoroolefins, non-fluorinated olefins, fluorinated allyl ethers, and fluorinated vinyl ethers described above may be useful comonomers. Fluoroplastic copolymers of tetrafluoroethylene can have comonomers in amounts varying from 0.001 mol % to 15 mol %, in some embodiments, 0.01 to 10 mol %. In some embodiments, the fluoroplastic in the particles has a melting point in a range from about 100 to 327° C., in some embodiments, about 200 to 320° C., and in some embodiments, 240 to 320° C.

Some other useful fluoroplastics useful for making fluoroplastic particles useful for practicing the present disclosure are fluorinated thermoplastics. Examples of suitable fluorinated thermoplastic polymers include fluoroplastics derived solely from VDF and HFP. These fluoroplastics typically have interpolymerized units derived from 99 to 67 weight percent of VDF and from 1 to 33 weight percent HFP, more in some embodiments, from 90 to 67 weight percent VDF and from 10 to 33 weight percent HFP. Another example of a useful fluoroplastic is a fluoroplastic having interpolymerized units derived solely from (i) TFE, (ii) more than 5 weight percent of one or more ethylenically unsaturated copolymerizable fluorinated monomers other than TFE. In some embodiments, these fluoroplastics are derived from copolymerizing 30 to 70 wt % TFE, 10 to 30 wt %, HFP, and 5 to 50 wt % of a third ethylenically unsaturated fluorinated comonomer other than TFE and HFP. For example, such a fluoropolymer may be derived from copolymerization of a monomer charge of TFE (e.g., in an amount of 45 to 65 weight %), HFP (e.g., in an amount of 10 to 30 weight %), and VDF (e.g., in an amount of 15 to 35 weight %). Another example of a useful fluoroplastic is a fluoroplastic derived from copolymerization of a monomer charge of TFE (e.g., from 45 to 70 weight %), HFP (e.g., from 10 to 20 weight %), and an alpha olefin hydrocarbon ethylenically unsaturated comonomer having from 1 to 3 carbon atoms, such as ethylene or propylene (e.g., from 10 to 20 weight %). Another example of a useful fluoroplastic is a fluoroplastic derived from TFE and an alpha olefin hydrocarbon ethylenically unsaturated comonomer. An example of a polymer of this subclass is a copolymer of TFE and propylene. Such copolymers are typically derived by copolymerizing from 50 to 95 wt. %, in some embodiments, from 85 to 90 wt. %, of TFE with from 50 to 15 wt. %, in some embodiments, from 15 to 10 wt. %, of the comonomer. Still other examples of useful fluoroplastics include polyvinylidene fluoride (PVDF) and a VdF/TFE/CTFE including 50 to 99 mol % VdF units, 30 to 0 mol % TFE units, and 20 to 1 mol % CTFE units.

In some embodiments, the fluoroplastic particles are made from a copolymer of a fluorinated olefin and at least one of a fluorinated vinyl ether or fluorinated allyl ether. In some of these embodiments, the fluorinated olefin is TFE. In these embodiments, the fluorinated vinyl ether or fluorinated allyl ether units are present in the copolymer in an amount in a range from 0.01 mol % to 15 mol %, in some embodiments, 0.01 mol % to 10 mol %, and in some embodiments, 0.05 mol % to 5 mol %. The fluorinated vinyl ether or fluorinated allyl ether may be any of those described above. In some embodiments, the fluorinated vinyl ether comprises at least one of perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, or $CF_3—(CF_2)_2—O—CF(CF_3)—CF_2—O—CF(CF_3)—CF_2—O—CF=CF_2$.

In some embodiments, the fluoroplastic particles do not have a cure site. In some embodiments, the fluoroplastic copolymer further comprises units comprising at least one of (a) a Br cure site, (b) an I cure site, (c) a nitrile cure site, or (d) a carbon-carbon double bond. The cure sites enable the fluoroplastic to participate in a cure reaction when combined with the amorphous fluoropolymer in the compositions according to the present disclosure. The Br, I, or nitrile cure sites can be incorporated into the fluoroplastic using any of the cure site monomers described above. Nitrogen-containing cure sites can also be incorporated into the fluoroplastic by employing selected chain transfer agents (e.g., $I(CF_2)_d CN$ in which d is 1 to 10 or 1 to 6) or by carrying out the free-radical polymerization in the presence of a perfluorosulfinate such as $NC(CF_2)_dSO_2G$, in which G represents a hydrogen atom or a cation with valence of 1 or 2. Bromo- and iodo-containing cure sites can be incorporated into the fluoroplastic using chain transfer agents other than those represented by formula II. Examples of suitable chain transfer agents I include those having the formula $R_fP$, wherein P is Br or I, preferably I, $R_f$ is an x-valent alkyl radical having from 1 to 12 carbon atoms, which, optionally may also contain chlorine atoms. Typically, x is 1 or 2. Useful chain transfer agents include perfluorinated alkyl monoiodide, perfluorinated alkyl diiodide, perfluorinated alkyl monobromide, perfluorinated alkyl dibromide, perfluorinated alkyl monobromide monoiodide, and combinations thereof. Specific examples include $CF_2Br_2$, $Br(CF_2)_2Br$, $Br(CF_2)_4Br$, $CF_2ClBr$, $CF_3CFBrCF_2Br$, $I(CF_2)_nI$ wherein n is an integer from 1-10 (e.g., $I(CF_2)_4I$), $Br(CF_2)_{11}I$ wherein n is an integer from 1-10 (e.g., $Br(CF_2)_2I$), and combinations thereof.

The cure site in the fluoroplastic may or may not be the same type as the cure site in the amorphous fluoropolymer. For example, both the fluoroplastic and the amorphous fluoropolymer may have an iodo cure site. In some embodiments, the fluoroplastic and the amorphous fluoropolymer have different types of cure sites. For example, the fluoroplastic may have a nitrile cure site and the amorphous fluoropolymer may have an iodo cure site. When the fluoroplastic and the amorphous fluoropolymer have different types of cure sites, the same or different curing agent may be useful depending on the specific cure sites. In some embodiments, a dual cure system may be useful.

The fluoroplastic particles useful in the composition according to the present disclosure have a mean particle size of less than 500 nanometers (nm). In some embodiments, the fluoroplastic particles have a mean particle size ranging from about 10 nm to about 500 nm. In some embodiments, the fluoroplastic particles have a mean particle size ranging from about 100 nm to about 500 nm. In some embodiments, the fluoroplastic particles have a mean particle size ranging from about 120 nm to about 500 nm. In some embodiments, the fluoroplastic particles have a mean particle size ranging from about 80 nm, 120 nm, 125 nm, or 130 nm to about 300 nm, 275 nm, or 250 nm. These particle sizes can be achieved when the fluoroplastic is prepared by aqueous emulsion polymerization in the presence of non-teleogenic fluorine containing surfactants using the methods described below. When the polymerization is carried out in an aqueous microemulsion (e.g., by using perfluoropolyoxyalkylene) smaller particles may be obtained. Particle sizes are determined by dynamic light scattering according to the method described in the examples, below.

The amorphous fluoropolymer and the fluoroplastic can both be made by known aqueous polymerization techniques including emulsion polymerization (wherein the polymerization occurs in polymer particles dispersed in water which may be electrostatically stabilized).

The reactor vessel for use in the polymerization process of the present disclosure is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluorinated monomer(s) and additional monomers may be charged to the reactor vessel. The monomers may be charged batch-wise or in a continuous or semi-continuous manner. By semi-continuous is meant that a plurality of batches of the monomer are charged to the vessel during the course of the polymerization. The independent rate at which the monomers are added to the kettle will depend on the consumption rate of the particular monomer with time. In some embodiments, the rate of addition of monomer will equal the rate of consumption of monomer (that is, conversion of monomer into polymer).

The reaction kettle is charged with water, the amounts of which are not critical. To the aqueous phase there is generally also added a fluorinated surfactant, typically a non-telogenic fluorinated surfactant although aqueous emulsion polymerization without the addition of fluorinated surfactant may also be practiced. Suitable fluorinated surfactants include any fluorinated surfactant commonly employed in aqueous emulsion polymerization.

An example of a useful fluorinated surfactant corresponds to the general formula:

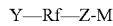

Y—Rf—Z-M wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Such fluorinated surfactants include fluorinated alkanoic acid and fluorinated alkanoic sulphonic acids and salts thereof, such as ammonium salts of perfluorooctanoic acid and perfluorooctane sulphonic acid. Also contemplated for use in the preparation of the polymers described herein are fluorinated surfactants of the general formula:

[Rf—O-L-COO—]$_i$X$^{i+}$ wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X^{i+}$ represents a cation having the valence i and i is 1, 2 and 3. In one embodiment, the emulsifier is selected from $CF_3$—O—$(CF_2)_3$—O—CHF—$CF_2$—C(O)OH and salts thereof. Specific examples are described in US 2007/0015937. Other examples of useful emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. Also contemplated for use in the preparation of the fluorinated polymers described herein are fluorinated polyether surfactants, such as described in U.S. Pat. No. 6,429,258.

In some embodiments, polymerizable fluorinated emulsifiers according to the following formula can be used in the preparation of the polymers described herein $X_2C$=CX$(CF_2)_m(CH_2)_n[O$—$(CX_2)_p]_q$—$[O$—$(CX_2)_r]_s$—$[O$—$(CX_2$—$CX_2)]_t$—$[(O)_w$—$(CX_2)_u]_v$—$[CH_2]_z$—Y where X is independently selected from H, F, or $CF_3$; Y is COOM or $SO_3M$; wherein the polymerizable fluorinated emulsifier comprises at least 1 fluorine atom. M is H, an alkali metal (e.g., Na, Ca, etc.), or NH4. Subscript m is 0-6, 0-5, 0-4; 0-3, or even 0-2. Subscript n is 0-6, 0-5, 0-4; 0-3, or even 0-2. Subscript p is at least 1, 2, 3, 4, or even 5; and no more than 20, 10, 8, or even 6. Subscript q is 0-6, 0-5, 0-4; 0-3, or even 0-2. Subscript r is 0-6, 0-5, 0-4; 0-3, or even 0-2. Subscript s is 0-6, 0-5, 0-4; 0-3, or even 0-2. Subscript t is 0-6, 0-5, 0-4; 0-3, or even 0-2. Subscript u is 0-6, 0-5, 0-4; 0-3, or even 0-2. Subscript v is 0-6, 0-5, 0-4; 0-3, or even 0-2. Subscript w is 0 or 1. Subscript z is 0-6, 0-5, 0-4; 0-3, or even 0-2. At least one of m, n, q, s, t, u, v, and z is at least 1. These fluorinated emulsifiers are able to be polymerized into the polymer during the polymerization.

Examples of useful polymerizable emulsifiers include fluorinated allyl and vinyl ethers including: $CF_2$=CF—$(CF_2)_m$—O—$(CF_2)_p$—O—$(CF_2)_r$—Y; $CF_2$=CF—$(CF_2)_m$—O—$(CF_2)_p$—$CH_2$—Y; $CF_2$=CF—$(CF_2)_m$—O—$(CF_2)_p$—[O—CF[$CF_3$]—$CF_2]_t$—O—CF($CF_3$)—Y; $CF_2$=CF—$(CF_2)_m$—O—$(CF_2)_p$—O—CHF—$CF_2$—Y; and $CF_2$=CF—$(CF_2)_m$—O—$(CF_2)_p$—O—CHF—Y.

where Y is COOM or $SO_3M$. M is H, an alkali metal, or $NH_4$. Subscript m is an integer from 0-6. Subscript r is an integer from 0-6. Subscript t is an integer from 0-6. Subscript p is an integer from 1-6.

Other examples of useful polymerizable emulsifiers include fluorinated olefins such as:

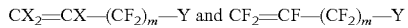

$CX_2$=CX—$(CF_2)_m$—Y and $CF_2$=CF—$(CF_2)_m$—Y where X is independently selected from H, F, or $CF_3$ and Y is COOM or $SO_3M$. M is H, an alkali metal, or $NH_4$. Subscript m is an integer from 1-6. In one embodiment, at least one of X in the fluorinated olefin is a H. In some embodiments, at least one of X in the fluorinated olefin contains a F atom. These emulsifiers are described in Int. Pat. App. Pub. Nos. WO 2014/088804 (Hintzer et al.) and WO 2014/088820 (Hintzer et al.).

Fluorinated surfactants may be used alone, or a combination of two or more fluorinated surfactants may be useful. The amount of the surfactant is generally within a range of 250 to 5,000 ppm (parts per million), preferably 250 to 2000 ppm, more preferably 300 to 1000 ppm, based on the mass of water to be used.

In some embodiments, the polymerization is substantially free of an emulsifier comprising an acid or salt. Such emulsifiers include fluorinated alkanoic acids and salts thereof; fluorinated alkanoic sulphonic acids and salts thereof, fluoroethoxy alkanoic acids and salts thereof; and combinations thereof. As used here, substantially free of an emulsifier, means less than 0.1%, 0.05%, 0.01%, or even 0.001% by weight of the emulsifier versus the total weight of the dispersion is present, or even no emulsifier is detected in the resulting dispersion.

For the polymerization to prepare the amorphous fluoropolymer disclosed herein, the fluorinated di-iodo ether compound represented by Formula II may be initially charged to the reaction kettle and/or subsequently added in a continuous or semi-continuous way during the polymerization. Typically, the amount of fluorinated di-iodo ether compound of formula II added will be at least 0.01, 0.05, or even 0.1% by weight and at most 0.5, 0.75, 1, 2, 3, 4, or even 5% by weight relative to the total weight of monomers fed into the reaction kettle. For the preparation of the fluoroplastic particles, other chain-transfer agents as described above may be added to the reaction vessel using any of these methods.

For some embodiments of the amorphous fluoropolymer and fluoroplastic, the cure site monomer as described above in any of its embodiments may also be added to the reaction kettle using any of these methods.

Because the feed amount of chain transfer agent and/or cure site monomer is relatively small compared to the monomer feeds, continuous feeding of small amounts of chain transfer agent and/or cure site monomer into the reactor can be achieved by blending the cure site monomer or chain transfer agent in one or more monomers. Examples of monomers useful for such a blend include HFP and the fluorinated vinyl ether or fluorinated allyl ether described above in any of their embodiments.

Polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as for example ammonium, sodium or potassium salts. Examples of per-acids include peracetic acid. Esters of the peracid can be used as well and examples thereof include tertiary-butylp-eroxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.001 and 2% by weight, preferably between 0.005 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper, and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

For the preparation of the amorphous fluoropolymer, a co-solvent may be used to generate small droplets of the diiodo-compounds represented by formula II, for example, in the use of a pre-emulsion or hot aerosol spray. Co-solvents are usually fluorinated organic liquids with boiling points of at least 10° C., 20° C., or even 30° C. However, as mentioned previously, because the fluorinated di-iodo ether compound is more soluble in water compared to their fluorinated hydrocarbon analogs, co-solvents may not be necessary when using the diiodo-compounds of Formula I. Therefore, in one embodiment, the polymerization and is conducted in the absence of an organic solvent. In some embodiments, the resulting dispersion comprising the amorphous fluoropolymer is substantially free of a solvent, meaning that less than 1% is present by weight based on the total weight of the dispersion.

The amount of polymer solids that can be obtained at the end of the polymerization is typically at least 10% by weight, or even at least 20% by weight, and up to 40% by weight, and even up to 45% by weight. The mean particle size of the fluoroplastic particles is described above. The mean particle size of the amorphous fluoropolymer may also be between 50 nm and 500 nm, in some embodiments, between 80 nm to 250 nm.

After polymerization, the dispersion comprising the amorphous polymer or fluoroplastic may be coagulated and washed as is known in the art. To coagulate the obtained latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the latex. Alternatively or additionally, the latex may be frozen for coagulation or may be coagulated by shear. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be sufficiently reduced by one washing.

In some embodiments of the composition according to the present disclosure, the composition is in the form of a latex blend comprising a second latex comprising the fluoroplastic particles and a first latex comprising the amorphous fluoropolymer. A method of making the composition can include blending a first latex comprising the fluoroplastic particles and a second latex comprising the amorphous fluoropolymer. The blend of the first latex and second latex may be co-coagulated, if desired, using any of the methods described above. Or the blend can be coagulated using a high-pressure homogenizer, and high shear coagulation in the presence of dissolved gas can be used as well. High-pressure coagulation techniques are known fluoroplastic processing techniques (e.g., U.S. Pat. No. 5,463,021). In general, high-pressure homogenization involves compressing and decompressing the latex blend through a series of small openings to form a coagulated blend.

In some embodiments (e.g., in embodiments in which the composition comprises less than 1 ppm total metal ion content), it is useful to avoid salts, e.g. alkali-metal salts, as coagulants. It may also be useful to avoid acids, alkaline earth metal salts, and other metal salts as coagulants to avoid metal contaminants. In embodiments in which the composition comprises less than 1 ppm total metal ion content, high-pressure coagulation or freeze coagulation may be useful.

The blend of the first and second latex may be further combined with a third latex, which may comprise an amorphous fluoropolymer or a fluoroplastic, to make a composition according to the present disclosure. The third latex may have the same fluoropolymer composition as one of the first or second latex, or it may have a different fluoropolymer composition (e.g., different monomers including different cure site monomers). In some embodiments, it is also useful to make the composition according to the present disclosure by blending isolated fluoropolymers. For example, an amorphous fluoropolymer which has been isolated and dried may be mixed with another amorphous fluoropolymer that has also been isolated and dried, wherein only one of the amorphous fluoropolymers includes fluoroplastic particles dispersed within it.

The amount of fluoroplastic in the composition according to the present disclosure can from about 1 to about 95 weight percent (wt %), 1 to about 90 wt %, or 1 to about 50 wt %. In some embodiments, the amount of fluoroplastic in the composition is at least about 5 wt %, and in some embodiments at least about 10 wt %. In some embodiments, the amount of fluoroplastic in the composition is below about 30 wt %, and in some embodiments below about 20 wt %. The amount of fluoroplastic in the composition is based upon the total weight of the composition.

In embodiments in which the fluoroplastic particles disclosed herein include cure site monomers (e.g. $CF_2$=CFO$(CF_2)_5$CN) the fluoroplastic particles can be produced by incorporating the comonomers homogenously, or as core-shell materials where at least about 60 mol % of the composition is polymerized before adding substantial amounts of the cure site monomer(s). One useful polymerization method for the fluoroplastic involves an emulsion polymerization in which, initially, at least 60 weight percent (wt %) (or at least 70 wt %) of the fluorinated monomer-containing composition is introduced into a polymerization reactor, after which at least 70 wt % (preferably at least 95 wt %) of a cure site-containing composition is introduced into the reactor. The cure site material copolymerizes with the fluorinated monomer. The net result is a fluoroplastic that may have a core-shell structure in which the core predominantly contains units derived from the fluorinated monomer and the shell contains the nitrogen-containing cure sites. More details regarding this process can be found in U.S. Pat. No. 7,019,083 (Grootaert et al.).

In some embodiments, the composition according to the present disclosure is prepared in a two-step polymerization, carried out in the same reactor. In some embodiments, the semicrystalline fluoroplastic is prepared in the first step (with the desired particle size) and in the second step the amorphous fluoropolymer is prepared. With this procedure, the composition according to the present disclosure can be in the form of a core-shell polymer in which the core comprises units predominantly derived from the fluoroplastic and the shell comprises the amorphous fluoropolymer. In other embodiment, the amorphous fluoropolymer is prepared in a first step and in the second step the fluoroplastic is prepared. With this procedure, the composition according to the present disclosure is in the form of a core-shell polymer in which the core comprises units predominantly derived from the amorphous fluoropolymer and the shell comprises the fluoroplastic.

In some embodiments, the amorphous fluoropolymers and/or fluoroplastics disclosed herein are highly fluorinated polymers, meaning that the polymers may comprise at least 50%, at least 60%, or even at least 70% and at most 76% fluorine on a weight basis compared to the total weight of the polymer.

In some embodiments, the amorphous fluoropolymers and/or fluoroplastics disclosed herein have low total metal ion content. In these embodiments, the compositions according to the present disclosure can be useful in the semiconductor industry (e.g., for semiconductor wet chemical process applications) as well as in other applications requiring high purity. In some embodiments, the composition according to the present disclosure comprises less than 1 ppm total metal ion content. In some embodiments, the total metal ion content in the composition is less than 500 ppb or 200 ppb.

The amorphous fluoropolymers and/or fluoroplastics disclosed herein comprise terminal groups. As used herein the term "terminal group" of a polymer comprises both end groups (i.e., groups that are at end positions of the polymer backbone) as well as side groups (i.e., groups that are pending on the backbone of the polymer). The polymer chain will at a minimum comprise one terminal group (i.e., the two end groups). If the polymer chain comprises branching, than the polymer chain will comprise more than two terminal groups.

When the amorphous fluoropolymer, made using a diiodo-compound of Formula II, is derived from a hydrogen containing monomer (e.g., VDF, ethylene, propylene, etc.), it has been discovered that fluorinated polymer comprises at least one —$CH_2$I terminal group (e.g., at least 2, at least 4, at least 6, at least 8, or even at least 10). The presence of —$CF_2$I terminal groups may be detectable by standard $^{19}$F NMR techniques, searching in the area of −38 to −40 ppm using a $C^{19}FCl_3$ reference, as described by Boyer et al. in Macromolecules, 2005, Vol. 38, 10353-10362.

In some embodiments, the amorphous fluoropolymers disclosed herein comprise 1 or more iodine atoms per polymer chain (e.g., 2, 3, 4, 5 or even more iodine atoms per polymer chain), indicating that the iodine is being incorporated into the fluoropolymer during polymerization.

As described above, bromine or iodine atoms are incorporated into the polymer chain during polymerization to allow for subsequent points for cross-linking. In the present disclosure, although not wanting to be limited by theory, it is believed that iodine atoms are incorporated into the amorphous fluoropolymer through the fluorinated di-iodo ether compound of Formula II, which acts as a chain transfer agent. Before it is cured, the amorphous fluoropolymer will typically have a terminal segment represented by formula III: $R_f$—CF(I)—$(CX_2)_n$—$(CX_2CXR)_m$—O—$R''_f$—$O_k$—$(CXR'CX_2)_p$—$(CX_2)_q$—CF($R'_f$)—. Additional iodine atoms may also be incorporated using an iodine-containing cure site monomer.

In some embodiments, the amorphous fluoropolymer comprises 0.01 to 3 wt % of iodine. In one embodiment, the highly fluorinated polymer of the present disclosure comprises at least 0.05, 0.1, 0.2 or even 0.3% by weight iodine relative to the total weight of the amorphous fluoropolymer gum. In one embodiment the amorphous fluoropolymer of the present disclosure comprises at most 0.4, 0.5, or even 0.75% by weight iodine relative to the total weight of the amorphous fluoropolymer. These iodine groups are thought to be either terminal end groups, resulting from an iodinated chain transfer agent and/or end groups from an iodine-containing cure site monomer. These iodine groups may then be used to cross-link the amorphous fluoropolymer. In one embodiment, a cure site monomer may not be necessary even when manufacturing fluoroelastomeric compositions. However, in other embodiments, it may be desirable to include cure site monomers to increase the amount of cure sites in the fluoropolymer.

The amorphous fluoropolymers disclosed herein typically have Mooney viscosities (ML 1+10 at 121° C.) of greater than 5, 10, 15, 20, 30, 40, 50, 60, 80, or even 100 units and no greater than 150 units. The Mooney viscosity can be determined, for example, according to ASTM D-1646-07 (2012). The fluoroelastomers may have a monomodal or bi-modal or multi-modal weight distribution.

In some embodiments, the amorphous fluoropolymer in particular has a low presence of carbonyl content. The carbonyl content of the amorphous fluoropolymer may be determined by an integrated absorbance ratio method based on Fourier transform infrared analysis (FTIR). This method may also be used to determine the carboxyl, carboxylate, and carboxamide groups and relies on the baseline corrected integrated absorption underneath prominent peaks in the FT-IR spectrum of a pressed film of the highly fluorinated elastomer gum. In particular, the integrated absorbance of the most prominent peaks between approximately 1620 cm$^{-1}$ to 1840 cm$^{-1}$ are measured. These peaks correspond to absorbances attributable to carbonyl moieties present in the polymer. This baseline corrected integrated absorbance under the most intense peaks within the range of 1620 cm$^{-1}$ and 1840 cm$^{-1}$ is divided by the baseline corrected integrated absorbance of the C—F stretch overtone between 2220 cm$^{-1}$, and 2740 cm$^{-1}$, which is indicative of the thickness of the sample. This gives the carbonyl absorbance ratio which characterizes the carboxyl, carboxylate, and carboxamide content of the polymer. The polymers useful in this disclosure have an integrated absorbance ratio less than 0.07, less than 0.04, or even less than 0.03. Such measurement techniques are described in U.S. Pat. No. 6,114,452 (Schmiegel) and U.S. Pat. No. 8,604,137 (Grootaert et al.), herein incorporated by reference.

The presence of acidic end-groups is known to be detrimental to certain properties of the amorphous fluoropolymer. Thus, heating techniques have previously been used to convert carboxylate end groups to non-ionic endgroups. Although these carboxylate end groups are converted to non-ionic acid fluoride end groups, these acid fluoride end groups can be slowly hydrolyzed by ambient water in the environment and as such are converted back to carboxyl end groups. Thus, although a fluoropolymer may have a low integrated absorbance ratio after a heat treatment, over time the integrated absorbance ratio can increase. Because of the monomers selected and the polymerization methods employed, the amorphous fluoropolymers disclosed herein in one embodiment have a minimal amount of ionic endgroups and thus, they do not require a heat treatment step to achieve the low integrated absorbance ratio disclosed herein.

It is believed that in one embodiment, the amorphous fluoropolymer have a polymer architecture that favorably influences the mechanical properties and/or the curing behavior of the amorphous fluoropolymer by generating branched polymers, particularly when used in small amounts. The level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa·s) of the branched polymer measured at a temperature T and $[\eta]_{br}$ is the intrinsic viscosity (units ml/g) of the branched polymer at a temperature T' in a solvent in which the branched polymer can be dissolved and a and k are constants. These constants are determined from the following equation:

$$\eta_{0,lin} = k \cdot [\eta]_{lin}^{a} \qquad \text{eq. 2}$$

wherein $\eta_{0,lin}$ and $[\eta]_{lin}$ represent respectively the zero shear viscosity and intrinsic viscosity of the corresponding linear polymer measured at the respective same temperatures T and T' and in the same solvent. Thus, the LCBI is independent of the selection of the measurement temperatures and solvent chosen provided of course that the same solvent and temperatures are used in equations 1 and 2. The zero shear viscosity and intrinsic viscosity are typically determined on freeze coagulated polymers.

The LCBI of the fluoropolymer used should have a value of at least 0.2. However, when the level of branching (and thus the LCBI value) becomes too large, the polymer may have a gel fraction that cannot be dissolved in an organic solvent. One skilled in the art through routine experimentation may readily determine the appropriate value of LCBI. Generally, the LCBI will be between 0.2 and 5, preferably between 0.5 and 1.5. In one embodiment, the LCBI is greater than 0.2, 0.5, 1, 1.5, 2, 2.5, 4, or even 6.

The composition according to the present disclosure may be uncured or cured. A commonly used cure system is based on a peroxide cure reaction using appropriate curing compounds having or creating peroxides, which in turn are believed to generate free radicals. The fluoropolymers suitable for use in peroxide curing systems (peroxide curable fluoropolymers) contain reactive sites which include halogens, such as bromine and/or iodine. It is generally believed that the bromine or iodine atoms are abstracted in the free radical peroxide cure reaction, thereby causing the fluoropolymer molecules to cross-link and to form a three-dimensional network. Accordingly, when the composition according to the present disclosure is cured, it will typically have a segment represented by formula I:

—CF(R$_f$)—(CX$_2$)$_n$—(CX$_2$CXR)$_m$—O—R"$_f$—O$_k$— (CXR'CX$_2$)$_p$—(CX$_2$)$_q$—CF(R'$_f$)— in the three-dimensional network.

The compositions described above in any of their embodiments may be cured into fluorinated elastomers. The curable compositions can contain one or more cure systems. In some embodiments, the cure system is a peroxide cure system. The peroxide cure systems typically include an organic peroxide. The peroxide will cause curing of the composition to form a cross-linked (cured) fluoroelastomer when activated. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)-butyl]carbonate. A tertiary butyl peroxide having a tertiary carbon atom attached to a peroxy oxygen may be a useful class of peroxides. Further examples of peroxides include 2,5-dimethyl-2,5-di(t-butylperoxy) hexane; dicumyl peroxide; di(2-t-butylperoxyisopropyl) benzene; dialkyl peroxide; bis (dialkyl peroxide); 2,5-dimethyl-2,5-di(tertiarybutylperoxy)3-hexyne; dibenzoyl peroxide; 2,4-dichlorobenzoyl peroxide; tertiarybutyl perbenzoate; di(t-butylperoxy-isopropyl)benzene; t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy)butyl]carbonate, carbonoperoxoic acid, O,O'-1,3-propanediyl OO,OO'-bis(1,1-dimethylethyl) ester, and combinations thereof. The amount of peroxide curing agent used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts of the amorphous fluoropolymer and fluoroplastic may be used.

The curing agents may be present on carriers, for example silica containing carriers.

A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Exemplary coagents include: tri(methyl)allyl isocyanurate (TMAIC), triallyl isocyanurate (TAIC), tri(methyl)allyl cyanurate, poly-triallyl isocyanurate (poly-TAIC), triallyl cyanurate (TAC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and combinations thereof. Another useful coagent may be represented by the formula $CH_2=CH-Rf1-CH=CH_2$ wherein Rf1 may be a perfluoroalkylene of 1 to 8 carbon atoms. Such coagents provide enhanced mechanical strength to the final cured elastomer.

Curing of the fluoropolymer composition according to the present disclosure, wherein at least one of the amorphous fluoropolymer or the fluoroplastic has nitrogen-containing cure sites, can also be modified by using yet other types of curatives to achieve a dual cure system. Examples of such curatives for amorphous fluoropolymers with nitrile cure sites include fluoroalkoxy organophosphohium, organoammonium, or organosulfonium compounds (e.g., Int. Pat. Appl. Pub. No. WO 2010/151610 (Grootaert et al.), bis-aminophenols (e.g., U.S. Pat. No. 5,767,204 (Iwa et al.) and U.S. Pat. No. 5,700,879 (Yamamoto et al.)), bis-amidooximes (e.g., U.S. Pat. No. 5,621,145 (Saito et al.)), and ammonium salts (e.g., U.S. Pat. No. 5,565,512 (Saito et al.)). In addition, organometallic compounds of arsenic, antimony, and tin (e.g., allyl-, propargyl-, triphenyl-allenyl-, and tetraphenyltin and triphenyltin hydroxide) as described in U.S. Pat. No. 4,281,092 (Breazeale) and U.S. Pat. No. 5,554,680 (Ojakaar) and ammonia-generating compounds may be useful. "Ammonia-generating compounds" include compounds that are solid or liquid at ambient conditions but that generate ammonia under conditions of cure. Examples of such compounds include hexamethylenetetramine (urotropin), dicyandiamide, and metal-containing compounds of the formula $A^{w+}(NH_3)_xY^{w-}$, wherein $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion (e.g., a halide, sulfate, nitrate, acetate); and x is an integer from 1 to about 7. Further examples include substituted and unsubstituted triazine derivatives such as those of the formula:

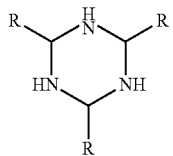

wherein R is a hydrogen atom or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The curable composition may further contain acid acceptors. Acid acceptors may be added to improve the fluoroelastomers steam and water resistance. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. However, some applications like fuel cell sealants or gaskets for the semiconductor industry require low metal content. Accordingly, in some embodiments, the composition is free of such acid acceptors or includes an amount of these acid acceptors such that the composition has less than 1 ppm total metal ion content.

In some embodiments, an acid acceptor is used between 0.5 and 5 parts per 100 parts of the curable composition. In other embodiments, an acid acceptor is not needed and the composition is essentially free an acid acceptor. In one embodiment of the present disclosure, a metal-containing acid acceptor is not needed and the curable composition is essentially free of a metal-containing acid acceptor. As used herein, essentially free of an acid acceptor or essentially free of a metal-containing acid acceptor means less than 0.01, 0.005, or even 0.001 parts per 100 parts of the composition according to the present disclosure or even none present.

A fluorinated elastomer compositions may be prepared by mixing the composition according to the present disclosure, a peroxide curing agent and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

Curing is typically achieved by heat-treating the curable composition. The heat-treatment is carried out at an effective temperature and effective time to create a cured fluoroelastomer. Optimum conditions can be tested by examining the cured highly fluorinated elastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

In the present curing process, the highly fluorinated polymer gum, along with the required amounts of peroxide, coagent, and other components (such as filler, pigments, plasticizers, lubricants and the like), is compounded by conventional means, such as in a two-roll mill, at elevated temperatures. The fluoropolymer gum is then processed and shaped (for example, in the shape of a hose or hose lining) or molded (for example, in the form of an O-ring). The shaped article can then be heated to cure the gum composition and form a cured elastomeric article.

The cured elastomers are particularly useful as seals, gaskets, and molded parts in systems that are exposed to elevated temperatures and/or corrosive materials, such as in automotive, chemical processing, semiconductor, aerospace, and petroleum industry applications, among others. Because the fluoroelastomers may be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation, and thermal aging, the initial sealing forces will decay over time. By determining the retained sealing force, elastomeric materials can be evaluated for their sealing force retention under a range of conditions, particularly under high temperature conditions, such as 200° C., 225° C., 250° C., and even 275° C.

Some Embodiments of the Disclosure

1. A composition comprising:
   fluoroplastic particles having a mean particle size of less than 500 nanometers; and
   an amorphous fluoropolymer comprising at least one of:
   a segment represented by formula I:

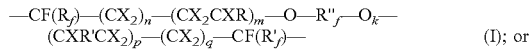
   (I); or a terminal segment represented by formula III:

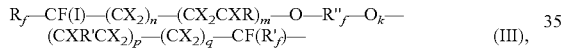
   (III), wherein
   X is independently selected from F, H, and Cl;
   $R_f$ and $R'_f$ are independently selected from F and a monovalent perfluoroalkyl having 1 to 3 carbons atoms;
   R is F, or a partially fluorinated or perfluorinated alkyl having 1 to 3 carbons atoms;
   $R''_f$ is a divalent fluoroalkylene having 1 to 8 carbon atoms or a divalent fluorinated alkylene ether having 1 to 20 carbon atoms and at least one ether linkage;
   k is 0 or 1; and n, m, p, and q are independently selected from an integer from 0 to 5, with the proviso that when k is 0, n+m is at least 1 and p+q is at least 1.

2. The composition of embodiment 1, wherein the amorphous fluoropolymer is a reaction product of components comprising:
   (a) a fluorinated di-iodo ether compound of the following formula II:

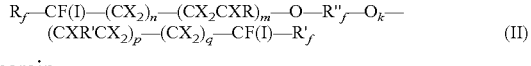
   (II)

wherein
   X is independently selected from F, H, and Cl;
   $R_f$ and $R'_f$ are independently selected from F and a monovalent perfluoroalkyl having 1 to 3 carbon atoms;
   R is F, or a partially fluorinated or perfluorinated alkyl having 1 to 3 carbons atoms;
   $R''_f$ is a divalent fluoroalkylene having 1 to 8 carbon atoms or a divalent fluorinated alkylene ether having 1 to 20 carbon atoms and at least one ether linkage;
   k is 0 or 1; and n, m, p and q are independently selected from an integer from 0 to 5, with the proviso that when k is 0, n+m is at least 1 and p+q is at least 1; and
   (b) a fluorinated olefin.

3. The composition of embodiment 2, wherein the components comprise from 0.1-1 wt % of the fluorinated di-iodo ether compound of formula II.

4. The composition of any one of embodiments 1 to 3, wherein the amorphous fluoropolymer is an amorphous copolymer comprising fluorinated olefin units and units comprising at least one of (a) a Br cure site, (b) a I cure site, (c) a nitrile cure site, or (d) a carbon-carbon double bond.

5. The composition of any one of embodiments 1 to 4, wherein the segment represented by formula I or the terminal segment represented by formula III comprises less than 1% by weight hydrogen.

6. The composition of any one of embodiments 1 to 5, wherein at least one of the segment represented by formula I or the terminal segment represented by formula III is perfluorinated.

7. The composition of any one of embodiments 1 to 6, wherein the fluorinated olefin comprises at least one of vinylidene fluoride, tetrafluoroethylene, or hexafluoropropylene.

8. The composition of any one of claims embodiments 1 to 7, wherein the amorphous fluoropolymer is an amorphous copolymer of the fluorinated olefin and at least one of a fluorinated vinyl ether or fluorinated allyl ether.

9. The composition of embodiment 8, wherein the fluorinated olefin is tetrafluoroethylene, and wherein the fluorinated vinyl ether comprises at least one of perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxyethylvinyl ether, or $CF_3-(CF_2)_2-O-CF(CF_3)-CF_2-O-CF(CF_3)-CF_2-O-CF=CF_2$.

10. The composition of embodiment 9, wherein the fluorinated allyl ether comprises at least one of perfluoro (methyl allyl) ether, perfluoro (ethyl allyl) ether, perfluoro (n-propyl allyl) ether, perfluoro-2-propoxypropylallyl ether, perfluoro-3-methoxy-n-propylallyl ether, perfluoro-2-methoxy-ethylallyl ether, or $CF_3-(CF_2)_2-O-CF(CF_3)-CF_2-O-CF(CF_3)-CF_2-O-CF_2CF=CF_2$.

11. The composition of any one of embodiments 1 to 10, wherein the amorphous fluoropolymer further comprises units from a non-fluorinated monomer.

12. The composition of embodiments 11, wherein the non-fluorinated monomer is ethylene, propylene, or combinations thereof 13. The composition of any one of embodiments 1 to 12, wherein the fluoroplastic particles have a mean particle size ranging from about 10 to about 500 nm.

14. The composition of any one of embodiments 1 to 13, wherein the fluoroplastic particles comprise a fluoroplastic polymer or copolymer of a fluorinated olefin.

15. The composition of embodiment 14, wherein the fluoroplastic particles comprise the fluoroplastic copolymer of the fluorinated olefin and at least one of a fluorinated vinyl ether or fluorinated allyl ether.

16. The composition of embodiment 15, wherein the fluorinated olefin is tetrafluoroethylene, and wherein the fluorinated vinyl ether comprises at least one of perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxyethylvinyl ether, or $CF_3—(CF_2)_2—O—CF(CF_3)—CF_2—O—CF(CF_3)—CF_2—O—CF=CF_2$.

17. The composition of any one of embodiments 14 to 16, wherein the fluoroplastic copolymer further comprises units comprising at least one of (a) a Br cure site, (b) an I cure site, (c) a nitrile cure site, or (d) a carbon-carbon double bond.
18. The composition of embodiment 17, wherein the fluoroplastic particles are core-shell particles, wherein the core comprises units of the fluorinated olefin, and wherein the shell comprises the cure site.
19. The composition of any one of embodiments 1 to 17, wherein the composition is in the form of a core-shell polymer, wherein the core comprises the fluoroplastic particles, and wherein the shell comprises the amorphous fluoropolymer.
20. The composition of any one of embodiments 1 to 17, wherein the composition is in the form of core-shell particles, wherein the core comprises the amorphous fluoropolymer and the shell comprises the fluoroplastic.
21. The composition of any one of embodiments 1 to 18, wherein the composition is a latex blend comprising a second latex comprising the fluoroplastic particles and a first latex comprising the amorphous fluoropolymer.
22. The composition of any one of embodiments 1 to 21, wherein the fluoroplastic particles are present in an amount up to 95 percent by weight, based on the total weight of the composition.
23. The composition of any one of embodiments 1 to 22, wherein the composition comprises up to 1 part per million metal ions.
24. A method of making the composition of any one of embodiments 1 to 18, the method comprising blending a first latex comprising the fluoroplastic particles and a second latex comprising the amorphous fluoropolymer.
25. A cured fluoroelastomer comprising a reaction product of a curing reaction of the composition of any one of embodiments 1 to 23 and a peroxide.
26. A shaped article comprising the cured fluoroelastomer of embodiment 25.
27. The shaped article of embodiment 20, wherein the shaped article is at least one of a hose, a tube, or an O-ring.

As shown in the examples below, cured amorphous fluoropolymers that included a thermoplastic having a particle size of several micrometers split under compression. Cured compositions according to the present disclosure did not split under compression.

EXAMPLES

The following abbreviations are used in the examples: min=minutes, hrs=hours, nm=nanometer, MPa=megapascals, dNm=decinewton meter, comp set=compression set, wt %=percent by weight, phr=parts per hundred rubber.

The indicated results were obtained using the following test methods, unless otherwise noted. The test results appear in the tables below.

Test Methods

Particle Size: The latex particle size determination was conducted by means of dynamic light scattering with an instrument available from Malvern, Worchestershire, UK, under the trade designation "Zetasizer 1000HSA," following a similar procedure as described in DIN ISO 13321:2004-10. The reported average particle size is the z-average. Prior to the measurements, the polymer latices as yielded from the polymerizations were diluted with 0.01 mol/L NaCl solution, available from Riedel-de Haen. The measurement temperature was 20° C. in all cases.

Cure Rheology: Cure rheology tests with results provided in Table 1 were carried out using uncured, compounded samples using a rheometer marketed under the trade designation "MDR 2000" from Alpha technologies, Akron, Ohio, in accordance with ASTM D 5289-93a at 177° C., no pre-heat, 15 minute elapsed time, and a 0.5 degree arc. Cure rheology tests with results provided in Table 2 were carried out using uncured, compounded samples using a rheometer marketed under the trade designation "PPA 2000" from Alpha technologies, Akron, Ohio, in accordance with ASTM D 5289-93a at 160° C., no pre-heat, 20 min elapsed time, and a 0.5 degree arc. For results provided in both tables, both the minimum torque ($M_L$) and highest torque attained during a specified period of time when no plateau or maximum torque ($M_H$) was obtained were measured. Also measured were the time for the torque to increase 2 units above $M_L$ ($t_S2$), the time for the torque to reach a value equal to $M_L+0.1(M_H-(t'10)$, the time for the torque to reach a value equal to $M_L+0.5(M_H-(t'50)$, and the time for the torque to reach $M_L+0.9(M_H-(t'90)$. Results are reported in Tables 1 and 2.

Compound Formulation: As described below and indicated in Tables 1 and 2, the polymers of each sample were press-cured using a peroxide cure package and various physical properties were measured. Batches were compounded with the amounts of materials as listed in Tables 1 and 2 on a two-roll mill.

Press-Cure: Sample sheets measuring 150×150×2.0 mm and o-rings having a cross-section thickness of 3.5 mm were prepared for physical property determination by pressing at about 6.9 MPa. Sample sheets and o-rings of examples and comparatives indicated in Table 1 were pressed for 5 min at 177° C. Sample sheets and o-rings of examples and comparatives indicated in Table 2 were pressed for 20 min at 160° C.

Post-Cure: Press-cured sample sheets and o-rings were exposed to heat in air for 16 hrs at 200° C. for examples and comparatives indicated in Table 1 and for 8 hrs at 200° C. for examples and comparatives indicated in Table 2. The samples were returned to ambient temperature before testing.

Physical Properties: Dumbbell specimens were cutout from the sheets and subjected to physical property testing similar to the procedure disclosed in ASTM D412-06a (2013).

Hardness: Samples were measured using ASTM D2240-85 Method A with Type A2 Shore Durometer. Units are reported in points on the Shore A scale.

Compression Set: The O-rings were subjected to compression set testing similar to the procedure disclosed in D1414-94 (2013)/ASTM 395-03 method B, with 25% initial deflection. Results are reported in Tables 1 and 2 below.

Perfluoroelastomer A

A perfluoropolymer by aqueous emulsion polymerization having interpolymerized units of 61.0 mole percent tetrafluoroethylene and 39.0 mole percent perfluoromethyl vinyl ether and iodine containing cure site monomers was prepared as described as for Example 4 in Int. Pat. Appl. Pub. No WO 2015/134435.

Preparative Example B

A perfluoroelastomer latex was prepared as described for the latex of Example 4 of Int. Pat. Appl. Pub. No WO 2015/134435 with the modification that the latex was not coagulated and dried. Instead the latex was blended (at 70 wt %) with the dispersion prepared as described for "Fluoroplastic B" in U.S. Pat. No. 6,734,254 (at 30 wt %), with the exception that ($CF_3$—O—$(CF_2)_3$—O—CHF—$CF_2$—$COONH_4$) was used in the place of ammonium perfluoro octanoate. "Fluoroplastic B" is a polymer of tetrafluoroethylene and perfluoropropylvinylether (a PFA). The average particle size of the fluoroplastic in this dispersion was 140 nm. The latex blend was then freeze coagulated, washed, and dried at 115° C. for 16 hours.

Preparative Example C

A perfluoroelastomer latex was prepared as described for the latex of Example 4 in Int. Pat. Appl. Pub. No WO 2015/134435 with the modification that the latex was not coagulated and dried. Instead the latex was blended (at 70 wt %) with the dispersion prepared as described for "Fluoroplastic C" in U.S. Pat. No. 7,019,083. (at 30 wt %). "Fluoroplastic C" is a polymer of tetrafluoroethylene, perfluoropropylvinylether and a cure site monomer $CF_2$=$CFO(CF_2)_5CN$ (a PFA). The average particle size of the fluoroplastic in this dispersion was 130 nm. The latex blend was then freeze coagulated, washed, and dried at 115° C. for 16 hours.

Examples 1 through 4

For Example 1, 67 phr of Perfluoroelastomer A and 33 phr of Preparative Example C were compounded with 2.5 phr of TAIC 72%, a triallyl isocyanurate and silicon dioxide blend, available under the trade designation "TAIC DLC-A" from Natrochem, Inc., Savannah, Ga., and 2 phr DBPH 50%, 2,5-dimethyl-2,5-di(t-butylperoxy)-hexane, 50% active, available under the trade designation "VAROX DBPH-50" from Vanderbilt Chemicals, LLC., Norwalk, Conn. Example 2 was prepared as in Example 1 except that 33 phr of Perfluoroelastomer A and 67 phr of Preparative Example C were used. For Example 3, 100 phr of Preparative Example C was compounded with 2.5 phr of TAIC 72% and 2 phr DBPH 50%. Example 4 was prepared as in Example 2 except that 67 phr of Preparative Example B was used in place of Preparative Example C. The results are included in Table 1 below.

Examples 5, 6 and 7

For Example 5, 33.3 phr of Preparative Example C and 66.7 phr of Perfluoroelastomer A were compounded with 2 phr of TAIC, triallyl isocyanurate, available under the trade designation "TAIC" from Nippon Kasei Chemical Company Limited, Japan, and 1.25 phr of DBPH neat, 2,5-dimethyl-2,5-di(t-butylperoxy)-hexane, 100%, available under the trade designation "PERHEXA 25B" from NOF Corporation. Examples 6 and 7 were prepared as in Example 5 except that 66.7 phr of Preparative Example C and 33.3 phr of Perfluoroelastomer A were used in Example 6 and 100 phr of Preparative Example C and 0 phr of Perfluoroelastomer A were used in Example 7. The results are included in Table 2 below.

Comparative Examples 1 and 2 (Comp. Ex-1 and Comp. Ex-2)

For Comparative Example 1, 80 phr of Perfluoroelastomer A and 20 phr of a PFA powder, available under the trade designation of "PFA-6502TAZ" from 3M, St. Paul, Minn., were compounded with 2.5 phr TAIC 72%, and 2 phr DBPH 50%. The PFA powder has less than 2% of the particles larger than 2000 micrometers and greater than 65% of the particles larger than 200 micrometers as determined by sieving methods. Therefore, it is concluded that the mean particle size is between 200 and 2000 micrometers. Comparative Example 2 was prepared as in Comparative Example 1 except that 100 phr of Perfluoroelastomer A and 0 phr of "PFA 6502 TAZ" PFA powder were used. The results are included in Table 1 below.

Comparative Examples 3, 4, and 5 (Comp. Ex-3-4, and -5)

For Comparative Example 3, 90 phr of Perfluoroelastomer A and 10 phr of PFA powder, available under the trade designation "PFA-6503PAZ" from 3M, St. Paul, Minn., were compounded with 2 phr of TAIC, and 1.25 phr of DBPH neat. The PFA powder has a mean particle size of about 30 micrometers. Comparative Examples 4 and 5 were prepared as in Comparative Example 3 except that 80 phr of Perfluoroelastomer A and 20 phr of "PFA-6503PAZ" PFA powder were used for Comparative Example 4, and 70 phr of Perfluoroelastomer A and 30 phr of "PFA-6503PAZ" PFA powder were used for Comparative Example 5. The results are included in Table 2 below.

In Tables 1 and 2, below, a blank space means that the indicated material was not added. The initials n.d. means "not determined".

TABLE 1

| Material (phr) | EX-1 | EX-2 | EX-3 | EX-4 | Comp Ex-1 | Comp Ex-2 |
|---|---|---|---|---|---|---|
| Perfluoroelastomer A | 67 | 33 | | 33 | 80 | 100 |
| Preparative Example B | | | | 67 | | |
| Preparative Example C | 33 | 67 | 100 | | | |
| PFA 6502 TAZ | | | | | 20 | |
| TAIC 72% | 2.5 | 2.5 | 2.5 | 2.5 | 2.5 | 2.5 |
| DBPH 50% | 2 | 2 | 2 | 2 | 2 | 2 |
| PFA content | 10% | 20% | 30% | 20% | 20% | 0% |
| Cure Rheology MDR (15 min @ 177° C.) | | | | | | |
| MH [dNm] | 24.0 | 28.2 | 32.9 | 28.3 | 33.4 | 21.1 |
| ML [dNm] | 1.5 | 2.1 | 5.1 | 2.3 | 1.8 | 1.2 |
| ts-2 [min] | 0.33 | 0.35 | 0.31 | 0.33 | 0.36 | 0.34 |

TABLE 1-continued

|  | Examples | | | | Comp. Examples | |
|---|---|---|---|---|---|---|
| Material (phr) | EX-1 | EX-2 | EX-3 | EX-4 | Comp Ex-1 | Comp Ex-2 |
| T50 [min] | 0.45 | 0.46 | 0.45 | 0.44 | 0.48 | 0.44 |
| T90 [min] | 0.58 | 0.61 | 0.59 | 0.57 | 0.65 | 0.59 |
| TanD @ MH | 0.019 | 0.027 | 0.017 | 0.027 | 0.014 | 0.014 |
| Physical Properties: Press Cure 5 min @ 177° C. and Post Cure 16 hrs @ 200° C. | | | | | | |
| Tensile strength [MPa] | 14.1 | 18.9 | 17.0 | 14.6 | 10.5 | 9.2 |
| Elongation [%] | 225 | 230 | 70 | 210 | 203 | 190 |
| 100% modulus [MPa] | 3.3 | 5.7 | 0.0 | 5.4 | 4.6 | 1.8 |
| Hardness [Shore A] | 69 | 80 | 89 | 79 | 77 | 61 |
| Compression Set: 70 hrs @ 200° C. (25% deflection on o-rings) | | | | | | |
| n-1 | 20.6 | 25.1 | 40.7 | 22.2 | SPLIT | 12.3 |
| n-2 | 19.4 | 25.7 | 37.7 | 20.4 | SPLIT | 17.2 |
| Ave % set | 20.0 | 25.4 | 39.2 | 21.3 | SPLIT | 14.8 |
| Compression Set: 70 hrs @ 232° C. (25% deflection on o-rings) | | | | | | |
| n-1 | 55 | 62 | 87 | 55 | SPLIT | 50 |
| n-2 | 56 | 60 | 76 | 61 | SPLIT | 52 |
| Ave % set | 55 | 61 | 82 | 58 | SPLIT | 51 |

TABLE 2

|  | Examples | | | Comparative Examples | | |
|---|---|---|---|---|---|---|
| Material (phr) | EX-5 | EX-6 | EX-7 | Comp. Ex-3 | Comp. Ex-4 | Comp. Ex-5 |
| Perfluoroelastomer A | 66.7 | 33.3 |  | 90 | 80 | 70 |
| Preparative Example C | 33.3 | 66.7 | 100 |  |  |  |
| PFA-6503PAZ |  |  |  | 10 | 20 | 30 |
| TAIC | 2 | 2 | 2 | 2 | 2 | 2 |
| DBPH neat | 1.25 | 1.25 | 1.25 | 1.25 | 1.25 | 1.25 |
| PFA content | 10% | 20% | 30% | 10% | 20% | 30% |
| Cure Rheology MDR (20 min @ 160° C.) | | | | | | |
| MH [dNm] | 21.1 | 27.8 | 49.1 | 21.6 | 27.6 | 35.5 |
| ML [dNm] | 1.4 | 4.1 | 10.2 | 0.9 | 1.3 | 1.9 |
| ts-2 [min] | 0.53 | 0.5 | 0.37 | 0.59 | 0.53 | 0.48 |
| T50 [min] | 0.78 | 0.78 | 0.97 | 0.88 | 0.82 | 0.73 |
| T90 [min] | 1.6 | 1.65 | 2.21 | 1.94 | 1.75 | 1.35 |
| TanD @ MH | 0.017 | 0.016 | 0.134 | 0.011 | 0.017 | 0.015 |
| Physical Properties: Press Cure 20 min @ 160° C. and Post Cure 8 hrs @ 200° C. | | | | | | |
| Tensile strength [MPa] | 11.7 | 15.3 | 13.8 | 12.4 | 13.0 | 12.0 |
| Elongation [%] | 171 | 91 | 39 | 201 | 209 | 186 |
| 100% modulus [MPa] | 6.6 | n.d. | n.d. | 3.5 | 4.6 | 6.8 |
| Hardness [Shore A] | 69 | 82 | 90 | 65 | 71 | 79 |
| Compression Set: 70 hrs @ 200° C. (25% deflection on o-rings) | | | | | | |
| n-1 | 29 | 34 | 62 | 32 | 35 | 40 |
| n-2 | 28 | 36 | 60 | 30 | Split | 40 |
| Ave % set | 29 | 35 | 61 | 31 | n.d. | 40 |
| Compression Set: 70 hrs @ 230° C. (25% deflection on o-rings) | | | | | | |
| n-1 | 58 | 70 | 95 | 60 | 66 | 75 |
| n-2 | 61 | 71 | 95 | 61 | Split | 75 |
| Ave % set | 59 | 71 | 95 | 60 | n.d. | 75 |

Foreseeable modifications and alterations of this disclosure will be apparent to those skilled in the art without departing from the scope and spirit of this disclosure. The invention should not be restricted to the embodiments that are set forth in this application for illustrative purposes.

What is claimed is:

1. A composition comprising:
   fluoroplastic particles having a mean particle size of less than 500 nanometers; and
   an amorphous fluoropolymer comprising at least one of:
   a segment represented by formula

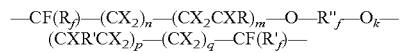

or a terminal segment represented by formula

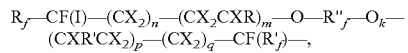

wherein
each X is independently F, H, or Cl;
$R_f$ and $R'_f$ are each independently F or a monovalent perfluoroalkyl having 1 to 3 carbon atoms;
R and R' are each independently F or a partially fluorinated or perfluorinated alkyl having 1 to 3 carbons atoms;
$R''_f$ is a divalent fluoroalkylene having 1 to 8 carbon atoms or a divalent fluorinated alkylene ether having 1 to 20 carbon atoms and at least one ether linkage;
k is 0 or 1; and n, m, p, and q are each independently an integer from 0 to 5, with the proviso that when k is 0, n+m is at least 1 and p+q is at least 1, and wherein the amorphous fluoropolymer is a fluoroelastomer gum.

2. The composition of claim 1, wherein the amorphous fluoropolymer is a reaction product of components comprising:
(a) a fluorinated di-iodo ether compound of the following formula $R_f$—CF(I)—$(CX_2)_n$—$(CX_2CXR)_m$—O—$R''_f$—$O_k$—$(CXR'CX_2)_p$—$(CX_2)_q$—CF(I)—$R'_f$, wherein
each X is independently F, H, or Cl;
$R_f$ and $R'_f$ are each independently F or a monovalent perfluoroalkyl having 1 to 3 carbon atoms;
R and R' are each independently F or a partially fluorinated or perfluorinated alkyl having 1 to 3 carbons atoms;
$R''_f$ is a divalent fluoroalkylene having 1 to 8 carbon atoms or a divalent fluorinated alkylene ether having 1 to 20 carbon atoms and at least one ether linkage;
k is 0 or 1; and n, m, p and q are each independently an integer from 0 to 5, with the proviso that when k is 0, n+m is at least 1 and p+q is at least 1; and
(b) a fluorinated olefin.

3. The composition of claim 2, wherein the components comprise from 0.1 weight percent to 1 weight percent of the fluorinated di-iodo ether compound of formula $R_f$—CF(I)—$(CX_2)_n$—$(CX_2CXR)_m$—O—$R''_f$—$O_k$—$(CXR'CX_2)_p$—$(CX_2)_q$—CF(I)—$R'_f$.

4. The composition of claim 1, wherein the amorphous fluoropolymer is an amorphous copolymer comprising fluorinated olefin units and units comprising at least one of (a) a Br cure site, (b) a I cure site, (c) a nitrile cure site, or (d) a carbon-carbon double bond.

5. The composition of claim 1, wherein at least one of the segment represented by formula —CF($R_f$)—$(CX_2)_n$—$(CX_2CXR)_m$—O—$R''_f$—$O_k$—$(CXR'CX_2)_p$—$(CX_2)_q$—CF($R'_f$)— or the terminal segment represented by formula $R_f$—CF(I)—$(CX_2)_n$—$(CX_2CXR)_m$—O—$R''_f$—$O_k$—$(CXR'CX_2)_p$—$(CX_2)_q$—CF($R'_f$)— is perfluorinated.

6. The composition of claim 1, wherein the amorphous fluoropolymer is an amorphous copolymer of a fluorinated olefin and at least one of a fluorinated vinyl ether or fluorinated allyl ether.

7. The composition of claim 6, wherein the fluorinated olefin is tetrafluoroethylene, and wherein the fluorinated vinyl ether comprises at least one of perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, or $CF_3$—$(CF_2)_2$—O—$CF(CF_3)$—$CF_2$—O—$CF(CF_3)$—$CF_2$—O—CF=$CF_2$.

8. The composition of claim 1, wherein the fluoroplastic particles comprise a fluoroplastic polymer or fluoroplastic copolymer of a fluorinated olefin.

9. The composition of claim 8, wherein the fluoroplastic particles comprise the fluoroplastic copolymer of the fluorinated olefin and at least one of a fluorinated vinyl ether or fluorinated allyl ether.

10. The composition of claim 9, wherein the fluorinated olefin is tetrafluoroethylene, and wherein the fluorinated vinyl ether comprises at least one of perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, or $CF_3$—$(CF_2)_2$—O—$CF(CF_3)$—$CF_2$—O—$CF(CF_3)$—$CF_2$—O—CF=$CF_2$.

11. The composition of claim 8, wherein the fluoroplastic copolymer further comprises units comprising at least one of (a) a Br cure site, (b) an I cure site, (c) a nitrile cure site, or (d) a carbon-carbon double bond.

12. The composition of claim 1, wherein the fluoroplastic particles are present in an amount up to 95 percent by weight, based on the total weight of the composition.

13. The composition of claim 1, wherein the composition is a latex blend comprising a second latex comprising the fluoroplastic particles and a first latex comprising the amorphous fluoropolymer.

14. A method of making the composition of claim 1, the method comprising blending a second latex comprising the fluoroplastic particles and a first latex comprising the amorphous fluoropolymer.

15. A cured fluoroelastomer comprising a product of a curing reaction of the composition of claim 1 and a peroxide.

16. A shaped article comprising the cured fluoroelastomer of claim 15.

17. The composition of claim 2, wherein the fluorinated olefin comprises at least one of vinylidene fluoride, tetrafluoroethylene, or hexafluoropropylene.

18. The composition of claim 1, wherein the amorphous fluoropolymer further comprises units from at least one of ethylene or propylene.

19. The composition of claim 1, wherein the composition is in the form of a core-shell polymer, wherein the core comprises the fluoroplastic particles, and wherein the shell comprises the amorphous fluoropolymer.

20. The composition of claim 1, wherein the composition is in the form of core-shell particles, wherein the core comprises the amorphous fluoropolymer and the shell comprises the fluoroplastic.

* * * * *

UNITED STATES PATENT AND TRADEMARK OFFICE
CERTIFICATE OF CORRECTION

Page 1 of 2

PATENT NO. : 10,557,031 B2
APPLICATION NO. : 15/769933
DATED : February 11, 2020
INVENTOR(S) : Tamon Aoki It is certified that error appears in the above-identified patent and that said Letters Patent is hereby corrected as shown below:

In the Specification

Column 3
Line 58, delete "O—" and insert -- —O— --, therefor.
Line 61, delete "—(CF$_2$)—," and insert-- —(CF$_2$)$_x$—, --, therefor.
Line 67, delete "—CF$_2$—(O$_4$CF$_2$)—CF$_2$—" and insert -- —CF$_2$—(O—[CF$_2$]$_x$)—CF$_2$— --, therefor.

Column 4
Line 2, delete "X$_3$])$_b$—CX$_4$·X$_5$—" and insert -- X$_3$])$_h$—CX$_4$X$_5$— --, therefor.
Line 4, delete "—(CF$_2$)—(OCF$_2$—CF(CF$_3$))$_3$—O—(CF$_2$)" and insert
-- —(CF$_2$)$_x$—(OCF$_2$—CF(CF$_3$))$_j$—O—(CF$_2$)$_x$ --, therefor.
Line 7, delete "(CF$_2$)$_x$(—O—(CF$_2$—CF(CF$_3$)O)$_1$—(CF$_2$)—" and insert
-- (CF$_2$)$_x$—O—(CF$_2$—CF(CF$_3$)O)$_1$—(CF$_2$)$_x$— --, therefor.

Column 6
Line 54, delete "CF$_2$ CF$_2$" and insert -- CF$_2$CF$_2$ --, therefor.
Line 56, delete "CF$_2$ CF$_2$" and insert -- CF$_2$CF$_2$ --, therefor.

Column 7
Line 11, delete "CF$_2$ O-" and insert -- CF$_2$O- --, therefor.
Line 17, delete "CF$_3$CF$_2$" and insert -- CF$_3$, CF$_2$ --, therefor.
Line 19, delete "CF$_3$CF$_2$" and insert -- CF$_3$, CF$_2$ --, therefor.
Line 20, delete "CF$_2$ O" and insert -- CF$_2$O --, therefor.

Column 9
Line 26, delete "—CF$_2$)$_n$" and insert -- —CF$_2$)$_h$ --, therefor.
Line 34, delete "CF$_2$=CF$_0$" and insert -- CF$_2$=CFO --, therefor.
Line 39, delete "CF$_2$—CF" and insert -- CF$_2$=CF --, therefor.
Line 40, delete "CF$_2$—CF" and insert -- CF$_2$=CF --, therefor.
Line 40, delete "CF$_2$—" and insert -- CF$_2$= --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,557,031 B2

Line 41, delete "$CF_2$—CF" and insert -- $CF_2$=CF --, therefor.
Line 42, delete "$CF_2$—CF" and insert -- $CF_2$=CF --, therefor.
Line 43, delete "$CF_2$—CF" and insert -- $CF_2$=CF --, therefor.
Line 43, delete "$CF_2$—CF" and insert -- $CF_2$=CF --, therefor.
Line 44, delete "$CF_2$—CF" and insert -- $CF_2$=CF --, therefor.
Line 45, delete "$CF_2$—CF" and insert -- $CF_2$=CF --, therefor.
Line 46, delete "$CF_2$—CF" and insert -- $CF_2$=CF --, therefor.
Line 46, delete "$CF_2$—CF" and insert -- $CF_2$=CF --, therefor.
Line 52, delete "$CF_2=CF_0C_4F_8I$;" and insert -- $CF_2=CFOC_4F_8I$; --, therefor.
Line 66, delete "iodo-(" and insert -- iodo- ( --, therefor.

Column 12
Line 9, delete "$R_fP$," and insert -- $R_fP_x$, --, therefor.
Line 19, delete "$Br(CF_2)_{11}l$" and insert -- $Br(CF_2)_nI$ --, therefor.

Column 15
Line 24, delete "ammonium-alkali-" and insert -- ammonium- alkali- --, therefor.

Column 24
Line 52, delete "thereof" and insert -- thereof. --, therefor.

Column 26
Line 21, delete "$M_L+0.1(M_H–(t'10)$," and insert -- $M_L+0.1(M_H–M_L)$, $(t'10)$, --, therefor.
Line 22, delete "$M_L+0.5(M_H–(t'50)$," and insert -- $M_L+0.5(M_H–M_L)$, $(t'50)$, --, therefor.
Line 23, delete "$M_L+0.9(M_H–(t'90)$." and insert -- $M_L+0.9(M_H–M_L)$, $(t'90)$. --, therefor.